(12) United States Patent
Koermer et al.

(10) Patent No.: US 7,080,505 B2
(45) Date of Patent: Jul. 25, 2006

(54) VEHICULAR ATMOSPHERE CLEANSING METHOD

(75) Inventors: Gerald S. Koermer, Roseland, NJ (US); Jeffrey B. Hoke, North Brunswick, NJ (US); Ronald M. Heck, Frenchtown, NJ (US); Terence C. Poles, Ringoes, NJ (US); Edward T. Wolynic, Franklin Lakes, NJ (US)

(73) Assignee: Engelhard Corporation, Iselin, NJ (US)

( * ) Notice: Subject to any disclaimer, the term of this patent is extended or adjusted under 35 U.S.C. 154(b) by 335 days.

(21) Appl. No.: 10/615,811

(22) Filed: Jul. 8, 2003

(65) Prior Publication Data
US 2004/0020359 A1 Feb. 5, 2004

Related U.S. Application Data

(62) Division of application No. 09/799,838, filed on Mar. 6, 2001, now abandoned.

(51) Int. Cl.
*F01N 3/00* (2006.01)

(52) U.S. Cl. .............................. 60/274; 60/279; 60/281; 60/288; 60/296; 60/298; 60/311; 60/317; 165/4; 165/8; 165/10; 165/919; 422/168; 422/173; 422/211; 422/222; 95/113; 95/114; 95/120; 95/141; 95/143

(58) Field of Classification Search .................. 60/274, 60/278, 279, 281, 286, 287, 288, 292, 295, 60/296, 298, 299, 311, 317; 165/4, 8, 10, 165/272, 273, 919; 422/168–180, 211, 222; 95/113–121, 141, 143, 146; 96/143, 146; 123/198 A, 198 E
See application file for complete search history.

(56) References Cited

U.S. PATENT DOCUMENTS

| 3,738,088 | A |   | 6/1973  | Colosimo |
| 4,775,484 | A |   | 10/1988 | Schmidt et al. ............. 210/673 |
| 5,509,275 | A | * | 4/1996  | Bhatti et al. .................. 62/271 |
| 5,667,560 | A | * | 9/1997  | Dunne .......................... 95/113 |
| 5,804,155 | A |   | 9/1998  | Farrauto et al. |

(Continued)

FOREIGN PATENT DOCUMENTS

DE 43 18 738 C1 7/1994

(Continued)

OTHER PUBLICATIONS

Co-pending U.S. Appl. No. 09/460,924, filed Dec. 24, 1999 (US00/33061), now U.S. Patent 6,319,484.

(Continued)

*Primary Examiner*—Binh Q. Tran
(74) *Attorney, Agent, or Firm*—Richard A. Negin

(57) ABSTRACT

A vehicular atmosphere cleansing system utilizes a regenerative wheel having flow channels extending through the wheel coated with an adsorbant. An atmosphere stream passes through a first position dependent portion of the wheel where VOC's including HC's are adsorbed while a heated atmosphere stream passes through a second position dependent regenerative portion of the wheel whereat VOC's are desorbed. The adsorbant is activated carbon having particles of micropore size adhered to the substrate by a silicone binder producing high adsorption efficiencies while withstanding relatively high regenerative heat temperatures resulting from exhaust gas sensible heat. A hydrocarbon senses HC in the desorbed heated atmosphere stream to rotatively and sequentially index pie shaped, segmented portions of the wheel into the wheel's regenerative region while also functioning as the main component of an OBD device for the system.

13 Claims, 6 Drawing Sheets

U.S. PATENT DOCUMENTS

| | | | |
|---|---|---|---|
| 5,938,523 A | 8/1999 | Khelifa et al. | 454/156 |
| 6,044,644 A | 4/2000 | Hu et al. | |
| 6,212,882 B1 * | 4/2001 | Greger et al. | 60/274 |
| 6,216,778 B1 * | 4/2001 | Corwin et al. | 165/299 |
| 6,481,222 B1 * | 11/2002 | Denniston | 62/94 |
| 6,684,629 B1 * | 2/2004 | Bayerle et al. | 60/277 |
| 6,818,254 B1 * | 11/2004 | Hoke et al. | 427/429 |
| 6,820,681 B1 * | 11/2004 | Ohgami et al. | 165/10 |

FOREIGN PATENT DOCUMENTS

| | | |
|---|---|---|
| DE | 196 45 823 A1 | 5/1998 |
| DE | 199 29 456 A1 | 12/2000 |
| WO | WO 96/22146 | 7/1996 |
| WO | WO 97/11769 | 4/1997 |

OTHER PUBLICATIONS

Co-pending U.S. Appl. No. 09/391,637, filed Sep. 7, 1999 (US00/24343), now U.S. Patent 6,212,882.

Co-pending U.S. Appl. No. 09/579,563, filed May 26, 2000, now U.S. Patent 6,506,605.

Munters brochure available from internet at www.munterszeol.com/how.html.

* cited by examiner ly to a system in which the atmosphere is cleansed
VEHICULAR ATMOSPHERE CLEANSING METHOD This is a divisional of co-pending U.S. application Ser. No. 09/799,838 filed Mar. 6, 2001, which is incorporated herein by reference.

This invention relates generally to a system for purifying the atmosphere normally drawn into a vehicle and more particularly to a system in which the atmosphere is cleansed of volatile organic compounds (VOC's).

BACKGROUND

It is well known to provide a vehicle with any number of air treating systems to purify cabin air. In U.S. Pat. No. 5,667,560 to Dunne, a faujasite having a specific zeolite structure is coated on a rotating heat wheel. Cabin air is passed through a wheel portion whereat VOC's (volatile organic compounds) are adsorbed and the spent cabin air dehumidified whereupon it is returned as conditioned air to the cabin. The wheel rotates to another station where the adsorbed VOC's are heated and released to the atmosphere. Generally, cabin air treating systems are not entirely dissimilar to and bear resemblance to HVAC systems used in stationary buildings and the like. The cabin has a set volume of air which can be exhausted, purified and returned in relatively small sized units which can be easily mounted as appendages onto the vehicle.

It is well known that a large volume of atmosphere is drawn in when a motor vehicle operates. In German patent DE 43 18 738C1, published Jul. 14, 1994, it is noted that 384,000 m$^3$ of purified air could be possible within an hour of operation of 1,000 motor vehicles. The German patent does not describe how this is possible except by some general statements. However, long before the German patent, it was known to use the vehicle, itself, as a mobile atmosphere cleansing device. An air duct positioned on the vehicle and equipped with filters (electronic precipitators) for cleaning the air is disclosed in U.S. Pat. No. 3,738,088 to Colosimo. Colosimo mentions that a portion of the filtered air can be directed into the vehicle's carburetor. Colosimo also mentions that a catalytic postfilter, such as of the replaceable cartridge type, can be positioned downstream of the electrostatic precipitators to filter hydrocarbons (HC), nitrous oxides, sulphur oxides and the like. Obviously Colosimo's postfilter must adsorb or absorb VOC's until it is saturated whereupon it is replaced.

The assignee's related PCT publications WO 96/22146 and WO 97/11769 are directed to vehicular atmosphere cleansing devices and disclose catalytic compositions for removing i) ozone or ii) ozone and CO or iii) ozone, CO and HC's from an air stream, preferably passing through the vehicle's radiator on which is coated the catalytic compositions, as defined in the publications. The cleansed air is returned to atmosphere. The references are principally directed to catalyst compositions found effective to remove ozone, per se, or provide oxidation capabilities to not only remove ozone but also oxidize pollutants from atmospheric air at ambient temperatures contacting vehicular surfaces at vehicle operating temperatures. However, both references also mention as an alternate embodiment a pollutant treating catalyst composition which may comprise an activated carbon composition that can catalyze reduction of ozone to oxygen as well as adsorb other pollutants. The publications also suggest the used of adsorbent compositions to adsorb hydrocarbon (HC) and/or particulate material for later oxidation or subsequent removal and mentions zeolites, other molecular sieves, carbon and Group IIA alkaline earth metal oxides as adsorbers. No discussion of how the later oxidation or subsequent removal is accomplished in an automotive environment or even if regeneration is to be employed is made in the cited publications.

In a co-pending application, U.S. Ser. No. 09/460,924, filed Dec. 24, 1999 (US00/33061), there is disclosed a 2 stage zeolite trap arrangement which is sized to sequentially trap "large" HC's and then "smaller" HC's. Mixed with the zeolite is an oxidation catalyst, preferably selected from the platinum group metals. In the automotive application discussed in this application, a heated stream is valved into contact with the zeolite to affect desorption or a rotating heat wheel with an external heating source is disclosed. In either arrangement, because the platinum group metal catalyst oxidizes the VOC's, the air is cleansed after leaving the catalyst and exhausted to atmosphere. While this is an effective arrangement, the expense of the platinum group metal catalyst increases the system cost.

In another co-pending application, U.S. Ser. No. 09/391,637, filed Sep. 7, 1999 (US00/24343), there is disclosed a switching arrangement for a VOC adsorber/desorber especially adapted for automotive applications. The adsorber is described generally by reference to the above PCT applications to include such agents as zeolite, cordierite, active carbon, mullite or silicone carbide. The desorption is accomplished by switching in several disclosed ways. In one method, an electrical resistance heater is periodically heated. In another way, the outlet of the ambient air being drawn into the engine is blocked by valved passages maintained at different temperatures or by air directing louvers. The VOC's recovered during the desorption switch are directed into the engine's intake manifold and subsequently cleansed by the vehicle's catalytic converter exhaust system. In the adsorption stage the cleansed air can be emitted to atmosphere and a stream siphoned off to the intake manifold. The engine's ECU A/F ratio is said to be programmed to account for the periodic desorption stage and possibly control the switch between the stages. While a number of arrangements are disclosed in the prior application, it is generally not desirable in a vehicular environment to effect switching an ambient air stream which has an automotive cooling function nor is it desirable, from a reliability standpoint, to have moving parts that switch air streams or even periodically shut off and on the air streams. This prior application also mentions that conceptually an adsorbing wheel, a moving adsorbing strip or belt, etc in which the adsorbent means are located on or consist of a movable element can be utilized but no further discussion or showing of any such moving arrangement is disclosed. In general, the subject invention is directed to an adsorber/desorber arrangement for vehicular cleaning of the atmosphere, which avoids the expense of an oxidizing catalyst. It also addresses the problem of VOC disposal when the adsorber is regenerated by transferring the desorbed VOC's to the engine where the engine combustion and/or catalytic converter on the vehicle can oxidize the emissions. It is believed that the fundamental approach set forth in this application represents the type of system that can be viably commercialized. Accordingly, the invention in this application may be viewed as an extension, refinement or improvement of the basic concepts disclosed in the invention of U.S. Ser. No. 09/391,637.

Within the emission control art for treating exhaust emissions from vehicles powered by internal combustion engines, it is well known to provide a light-off catalyst in the exhaust system near the exhaust manifold which traps hydrocarbons (HC) during start-up of the vehicle and releases the HC for subsequent conversion by the vehicle's catalytic converter when the engine warms up. These light-off catalysts function as traps adsorbing the HC at low temperatures and releases them at higher temperatures whereat the catalytic converter on the vehicle is catalytically active. Reference can be had to assignee's U.S. Pat. No. 6,044,644 issued Apr. 4, 2000 to Hu et al. entitled "Close Coupled Catalyst" for a light-off catalyst and assignee's U.S. Pat. No. 5,804,155 to Farrauto et al. issued Sep. 8, 1998 entitled "Basic Zeolites as Hydrocarbon Traps for Diesel Oxidation Catalysts" for a HC trap in the exhaust system.

SUMMARY OF THE INVENTION

In a general summary, this invention uses the tried and proven regenerative characteristic of a heat wheel adapted to fit the automotive environment to effect a cleansing of the atmosphere drawn into the engine compartment of a vehicle.

In accordance with one aspect of the invention, a system for cleansing the atmosphere, including volatile organic compounds contained therein, drawn into the engine compartment of a vehicle having an internal combustion engine is provided which includes a rotatable regenerative heat wheel having channels extending therethrough from one side to an opposite side of the heat wheel and the channels have a coating of activated carbon on their surface. The system generally includes a mechanism for directing a stream of atmosphere at engine cabin ambient temperature through a first position dependent portion of the heat wheel on one side of the heat wheel and a mechanism for directing a heated stream of atmosphere through a second position dependent portion of the heat wheel at temperatures within the range of approximately 150–300° C. A mechanism for rotating the heat wheel is provided. The activated carbon is selected to have substantially a micropore porosity, a coating density greater than about 0.5 g/in$^3$ for substrates of metals, ceramics and plastics and a particle size less than about 25 microns which has been found able to withstand the relatively high regenerative temperatures required in the preferred application of the invention while attaining conversion efficiencies of volatile organic compound efficiencies in excess of 50%. Additionally and somewhat surprisingly, the regeneration of the activated carbon, (of the stated composition which is necessary to desorb the VOC's accumulated in the activated carbon), has been found to enhance the removal of ozone at conversion efficiencies in excess of 50%.

In accordance with another aspect of the invention, a system is provided for cleansing the atmosphere, including volatile organic compounds contained therein, drawn into the engine compartment of a vehicle through a forward vehicular opening having an internal combustion engine which includes a heat wheel in the engine compartment having one side defined as an entrance face surface and an opposite side defined as an exit face surface. A portion of the atmosphere drawn into the engine compartment passes through a heat inlet duct which in turn has a portion thereof in heat transfer relationship with the sensible heat of exhaust gases emitted by the engine whereby the atmosphere stream flowing through the heat inlet duct is heated from engine compartment ambient temperatures to higher temperatures. A heat outlet duct is also provided which has an entry end and an exiting end in fluid communication with an intake manifold of the engine. The entry end of the heat outlet duct is sized to correspond to the size of the exit end of the heat inlet duct and aligned to be in registry therewith. The heat wheel is positioned between the heat inlet and outlet ducts so that one side of the heat wheel confronts the exit end of the heat inlet duct and the opposite side of the heat wheel confronts the entry end of the heat outlet duct. A drive for rotating the heat wheel is provided and actuated so that at any given time a first position dependent portion of the heat wheel is in fluid communication with a first portion of the atmosphere stream drawn through the vehicle opening whereby the first atmosphere stream portion passes through the first position dependent portion of the heat wheel and is reintroduced back into the atmosphere. At the same time, a second position-dependent portion of the heat wheel in registry with the exiting end of the heat outlet duct and the entry end of the heat inlet duct is in fluid communication with a second portion of the atmosphere stream drawn through the vehicle's opening whereby the second atmosphere stream portion is heated by sensible exhaust gas heat and passes through the second position dependent portion of the heat wheel to the heat outlet duct and into the engine's intake manifold. The heat wheel has a plurality of channels extending from one side of the heat wheel to the opposite side thereof. At least selected channels are coated with an adsorber selected from the group consisting of zeolites, activated carbons, carbon molecular sieves (activated carbon being a species thereof), mesapore solids such as Mobile MCM41, silica gels, silica alumina and microporous solids formed for example, from silica, aluminum, titanium, cobalt, zinc or phosphorous besides zeolites whereby the volatile organic compounds are adsorbed in the first position dependent portion of the wheel and desorbed in the second position dependent portion of the wheel. This aspect of the invention is well suited for a vehicular application because, among other things, i) an adsorber/desorber material is used to remove the VOC's thus eliminating the need for any oxidizing catalyst, such as the expensive platinum metal group catalysts heretofore required for removing VOC's from the atmosphere; ii) sensible heat of the exhaust gases is used to provide the regenerative heat for the adsorber thus avoiding the expense and reliability problems associated with external heat sources such as resistance heaters and iii) the system uses fixed heat ducts without the necessity of moving vanes, louvers or valving of air flows to produce a highly efficient and reliable system suited to the harsh automotive environment. While a movable baffle may be provided at the entrance of the heat inlet duct should it be desired to not activate the system until normal engine operating conditions have been reached or shut off the system should an engine over heat condition produce excessive exhaust gas temperatures, once the baffle is opened the system is essentially steady state as described with the only moving component being the heat wheel which rotates.

Because the invention lacks any valving or movable baffles controlling atmospheric flow while utilizing sensible exhaust gas heat, the temperature of which can vary considerably as the vehicle experiences varying loads (such as that caused by vehicular acceleration), the adsorber is selected as a specific class of activated carbons which are able to withstand the high temperatures of the heated atmosphere without disintegration while retaining its regenerative abilities to adsorb VOC's. The activated carbon includes those carbons as stated, which have a substantially micropore porosity, a loading on the channels of at least about 5 g/in$^3$ and a particle carbon size of less than about 25 microns, preferably less than 5 microns. Importantly the binder chosen to adhere the activated carbon to the substrate (heat wheel channel walls) has to not only withstand the high temperatures but it also cannot plasticize to a viscosity whereat the porosity of the activated carbon is adversely affected. This invention has determined that a binder substantially comprising silicone in any form, such as polymeric silicones, silica sols and silicates, is suitable for this inventive application. Improved adhesion is obtained with silicone binder added to carbon containing coatings which are heated to elevated temperatures in air. Improved adhesive results may also be obtained if the coating with binder, preferably a silicon latex binder, is first heated with an inert gas, preferably nitrogen, to an elevated temperature to in effect carbonize the binder prior to air heating the binder at higher temperatures.

In accordance with another aspect of the invention, a system is provided for cleansing the atmosphere from volatile organic compounds contained therein which is drawn into the engine compartment of a vehicle having an internal combustion engine. The system includes a rotatable heat wheel having channels extending therethrough and coated with an adsorber selected from the group consisting of zeolites, active carbons, carbon molecular sieves, mesapore solids and micropore solids. A mechanism is provided for directing a stream of atmosphere at engine cabin ambient temperature through a first position dependent portion of the heat wheel on one side thereof and for directing a heated stream of atmosphere through a second position dependent portion of the heat wheel. A heat outlet duct is provided for directing the heated stream of atmosphere after passing through the heat wheel to the exhaust emission system of the engine and a sensor in the heat outlet duct determines the presence of hydrocarbons in the heated atmosphere for evaluating the effectiveness of the heat wheel. In one inventive embodiment, the desorption ability of the heat wheel is determined by a routine implemented through a microprocessor analyzing the sensor signals to ascertain whether the heat wheel has worn to the state of replacement whereat the routine activates a warning light in the vehicle's operator cabin in compliance with OBD (on board diagnostics) emission system requirements. In another inventive embodiment, the desorption ability of the heat wheel is utilized to cause rotation of the heat wheel through set angular increments. In accordance with this embodiment, the invention can control the indexing of the heat wheel by utilizing a programmed routine modeled as a function of time of a test or standard heat wheel to desorb a fully saturated heat wheel segment as it ages. However, in the preferred form of this inventive embodiment, a programmable routine comparing sensor signals over set time periods is utilized to effect indexing of the heat wheel. Significantly, the routines are not mutually exclusive so that sensor readings can control heat wheel rotation while also providing fail safe warnings.

In accordance with another specific inventive aspect of the invention related to the last mentioned inventive object, the sensor selected for hydrocarbon detection is a calorimetric sensor in which one heated channel of the sensor is provided with an oxidizing catalyst of the platinum metal group and its electrical resistivity compared to that of a heated reference channel so that HC's in the ppm range present in the atmosphere can be accurately detected to assure functioning of the heat wheel.

In accordance with another aspect of the invention, a method is provided for cleansing the atmosphere drawn into the engine compartment of a vehicle powered by an internal combustion engine that includes the steps of:

a) drawing a first stream of atmosphere through a vehicular opening into the engine compartment of a vehicle by means of a fan and/or the motion of the vehicle and the first atmosphere steam is at ambient engine cabin temperature;

b) drawing a second stream of atmosphere either separately from the first stream or split from the first stream by means of a fan and/or the motion of the vehicle;

c) heating the second atmosphere stream by sensible heat from exhaust gases produced by the engine to temperatures in the range of approximately 150 to 300° C.;

d) providing a heat wheel having channels extending therethrough from one side of the heat wheel to the opposite side of the heat wheel and the channels having as a coating thereon activated carbon of substantially micropore porosity, a density of at least 0.5 $g/in^3$ and a mean particle size not greater than approximately 25 microns;

e) passing the first stream of atmosphere through channels occupying, at any given time, a first position dependent portion of the heat wheel to adsorb volatile organic compounds contained in the atmosphere;

f) passing the second stream of heated atmosphere through channels occupying, at any given time, a second position dependent portion of the heat wheel to desorb volatile organic compounds contained in said channels;

g) directing the second stream of heated atmosphere with volatile organic compounds desorbed from the wheel to the gaseous emission treating system of the vehicle; and, h) rotating the wheel so that before the channels in the first position dependent portion of the heat wheel become saturated with volatile organic compounds they are rotated into a position whereat the channels become channels forming the second position dependent portion of the heat wheel while the desorbed channels formerly forming the second position dependent portion of the heat wheel are rotated into a position whereat the channels become part of the channels forming the first position dependent portion of said heat wheel.

In accordance with an implementing feature of the invention, the heat wheel is of the traditional "pancake" design with relatively short axially extending channels, and the wheel is divided into arcuate segments (i.e., "pie shaped") extending between radial lines forming a set included angle therebetween, the radial lines forming spaces between adjacent arcuate segments. The exit end of the heat inlet duct and the entry end of the heat outlet duct are configured to match an arcuate segment and the heat wheel rotated incrementally, a segment at a time, to minimize heat conduction between the first and second heat wheel portions. Further, and preferably, the flow of atmosphere through the desorbing second position dependent portion of the heat wheel can be opposite to the flow of the adsorbing first position dependent portion of the heat wheel which may promote loosening and removing particulates, among other things. Alternatively, other heat wheel configurations such as that of a "donut" design with relatively short radially extending channels may be utilized or even a stationary heat wheel with rotating heat ducts can be employed. In all instances, the heat wheel, while regenerating the activated carbons, is not functioning as a classic heat wheel which effects heat exchange by heating heat wheel passages to a high temperature for subsequent reaction with a colder gas stream. In the present invention, the heat wheel heated segments are isolated from the segments in the first dependent position so that as the heated segment returns into the first dependent position, the activated carbon can quickly return to its adsorbing state.

In a still further inventive embodiment of the invention utilizing the activated carbon inventive features, the heat wheel has activated carbon coated or deposited at the entrance end of each channel for a discrete distance and the heat wheel has an ozone removing catalyst, preferably $MnO^2$, deposited or coated at its exit end and extending therefrom for a discrete distance but with neither activated carbon nor ozone removing catalyst overlapping one another. The activated carbon selected for this invention is effective for removing ozone at higher than 50% efficiency so that its selection as the adsorber is sufficient to not only treat VOC's but also remove ozone. Combining a known ozone conversion catalyst with the activated carbon assures high efficiencies for ozone removal from the atmosphere and it is believed the regeneration of the heat wheel extends the life of the ozone removal catalyst. Still further, the sensor inventor embodiment, predicated on sensing VOC's to satisfy OBD requirements, can also be utilized to satisfy OBD ozone requirements in that a correlation between VOC's and ozone removal can be modeled and the programmed failure warning routine modified to account for ozone efficiency based on the detected efficiency of the activated carbon to remove HC's.

In general summary of the various objects, features, and advantages of the present invention, it may be said that the invention has one or more or any combination of the following:

a) Stable system for vehicular atmosphere cleansing system;
b) Inexpensive;
c) High conversion efficiencies;
d) Long life;
e) VOC removal+other emissions such as ozone;
f) OBD detection;
g) Programmed operation; and,
h) Stabilized activated carbon implementation.

These and other objects, features and advantages of the invention will become apparent to those skilled in the art upon reading and understanding the Detailed Description of the Invention set forth below taken in conjunction with the drawings.

BRIEF DESCRIPTION OF THE DRAWINGS

The invention may take form in certain parts and in an arrangement of certain parts taken together and in conjunction with the attached drawings which form part of the invention and wherein.

DETAILED DESCRIPTION OF THE INVENTION

Figure 1:
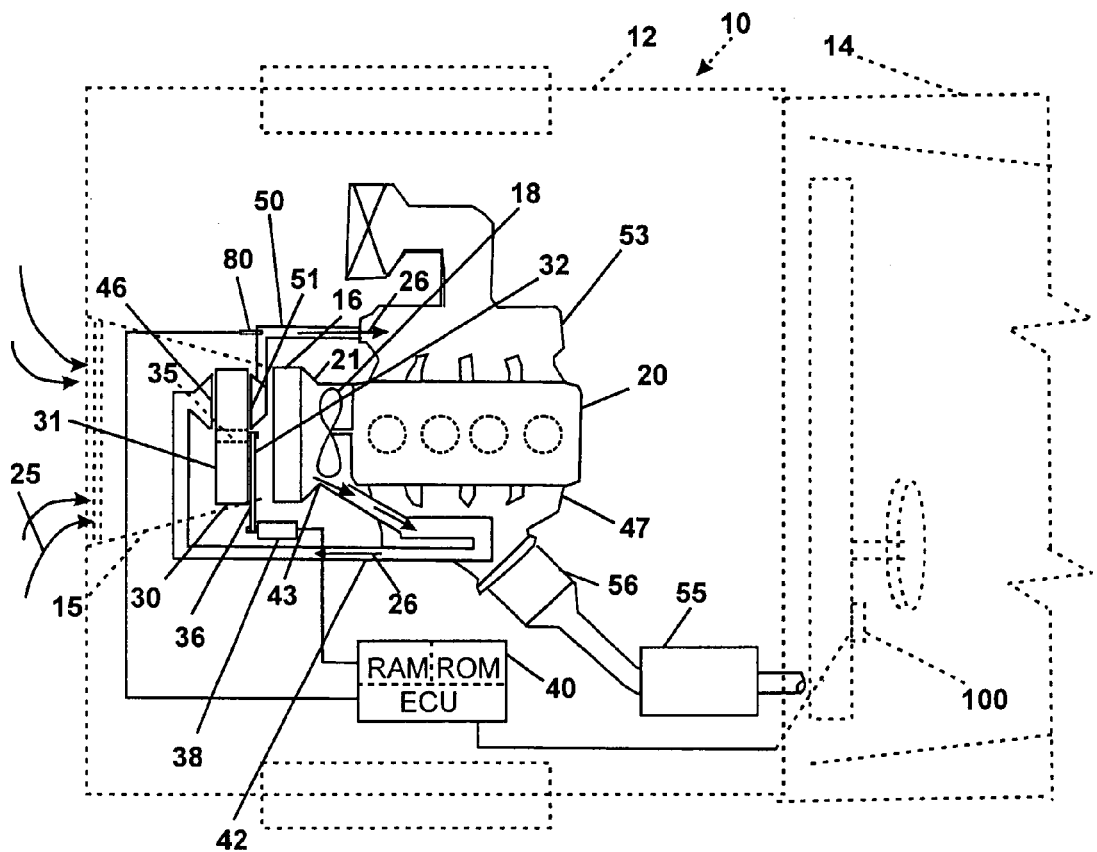
FIG. 1 is a schematic plan view of a vehicular engine compartment fitted with the atmosphere cleansing system of the present invention.

Referring now to the drawings wherein the showings are for the purpose of illustrating a preferred embodiment of the invention only, and not for the purpose of limiting the same, there is schematically portrayed in FIG. 1 a portion of a vehicle 10 shown in dash lines and including an engine compartment 12 and an operator cabin 14.

A) The General VOC Removal System

Vehicle 10 has one or more forward vehicular openings, designated by reference numeral 15, which may be conventionally understood as comprising the vehicle's grille in the preferred embodiment. Behind the grille or forward opening 15 is the vehicle's radiator 16 and rearward of radiator 16 is the vehicle's fan 18 powered by the vehicle's internal combustion engine 20. For illustration purposes only, a shroud 21 is provided between radiator 16 and engine 20 and it is understood that there are any number of openings (not shown) in the shroud to permit egress of the atmosphere.

As is well understood, ambient air or the atmosphere is drawn by fan 18 through grille 15, through radiator 16 and out into engine compartment 12 after passing the blades of fan 18. As a matter of general definition and for consistent terminology when used throughout this specification, "atmosphere" means the outside air that we breathe and includes in addition to the standard chemical compositions (nitrogen, oxygen, and lesser amounts of carbon dioxide, argon, hydrogen etc.) trace amounts of volatile organic compounds (VOC), including hydrocarbons (HC) such as toluene, o-xylene, hexane, benzene, methylene chloride, carbon tetrachloride etc. Also contained in the atmosphere is carbon monoxide and ozone and any number of particulates. The atmosphere is "purified" or "cleansed" if one or more of such mentioned items is removed or reduced or reacted into a less harmful form. This invention is particularly concerned with removing VOC's from the atmosphere, VOC's, and more specifically HC's, are typically present in today's atmosphere, depending on location, anywhere from a "normal" of 2 ppm in urban areas to higher levels (concentrations triple normal, i.e., 6, have been reported), which can occur in highly urbanized or smog areas of the country. An "atmosphere stream" or a "stream of atmosphere" as opposed to "atmosphere" will refer to the atmosphere drawn into engine compartment 12 by fan 18 or motion of vehicle 10 or by a combination of vehicle motion and fan draw, which is typically the case. In the conventional vehicle 10, as described an atmosphere stream designated by arrows 25 is drawn into engine compartment 12 by fan 18 and/or motion of vehicle 10.

In accordance with the invention a regenerated heat wheel 30 is fitted into engine compartment 12. A heat wheel is a well known device in the art and will not be described in detail herein. It typically has passages through which at least first and second fixed gaseous streams at different temperatures flow. The wheel rotates so that its passages are sequentially exposed to the gaseous streams. When the wheel is exposed to the "high" temperature gaseous stream its passages become heated as the hot gases flow therethrough. When the passages are rotated into the "low" temperature gaseous stream, the passages give up their heat to the low temperature gas stream, thus heating the low temperature gas stream. This invention uses a rotating, regenerative heat device to accomplish adsorbing and desorbing VOC's as described below and this device physically resembles a heat wheel. Accordingly, the device will hereafter be termed "heat wheel" but this invention does not use a heat wheel in its classic use sense as described. In fact, the use of heat wheel 30 in this invention is opposite to that of a normal heat wheel use.

Figure 2:
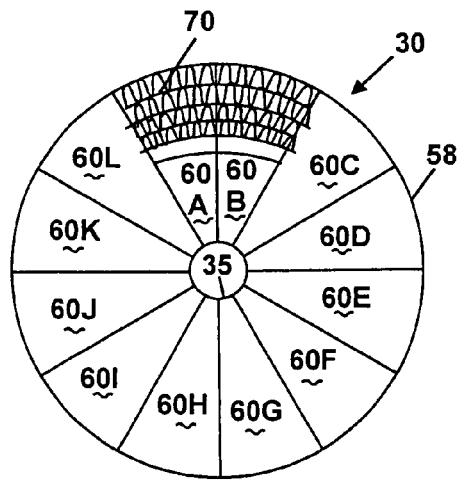
FIG. 2 is a schematic front view of a heat exchange wheel showing a portion of end views of the channels therein.

In the preferred embodiment, heat wheel 30 has a flat, pancake shape extending from one side, defined as an entrance face surface 31 to the opposite side, defined as an exit face surface 32. Extending between the sides or face surfaces 31, 32 are a plurality of channels as shown in FIG. 2. Heat wheel 30 rotates about its center hub 35 such as by a belt 36 driven by a motor 38. The actuation and speed of motor 38 is controlled by a microprocessor, preferably the vehicle's ECU 40, having a programmed routine(s), described further below, stored in ROM memory and executed through RAM memory in a conventional manner.

A heat inlet duct schematically shown by reference numeral 42 has an entrance end 43 in fluid communication with a portion of atmosphere stream 25, and an exit end 46 confronting entrance face surface 31 of heat wheel 30. That portion of atmosphere stream 25 flowing in heat inlet duct 42, is schematically depicted by reference arrow 26. Within heat inlet duct 42 is a heat transfer mechanism. In accordance with the broader scope of the invention the heat transfer mechanism can be any heat source, such as a resistance heater. However, in accordance with specific features of the invention, the heat source is desired to be the latent heat of the exhaust gases produced by engine 20 for cost efficiency and reliability purposes.

In accordance with this aspect of the invention, the latent heat of the exhaust gases can be utilized by simply placing a gas-to-gas heat exchanger within heat inlet duct 42. In the preferred embodiment, however, heat inlet duct 42 is constructed to form a closed channel passing over an exhaust gas manifold 47 of engine 20. Atmosphere stream 25 thus comes into contact with the exterior surface of exhaust gas manifold 47 as it travels in heat inlet duct 42 and is heated and becomes a heated atmosphere stream 26 and will be hereafter referred to as such throughout this description.

A heat outlet duct 50 completes the description of the fluid flow components used in the system of the invention. Heat outlet duct 50 has an entry end 51 which is shaped or configured to be substantially identical with exit end 46 of heat inlet duct 42. Further, entry end 51 of heat outlet duct 50 and exit end 46 of heat inlet duct 42 are aligned with one another so as to be in registry with one another. Heat wheel 30 is positioned to be between entry end 51 of heat outlet duct 50 and exit end 46 of heat inlet duct 42 so that heated atmosphere stream 26 flows from heat inlet duct 42 through heat wheel 30 and into heat outlet duct 50. In the preferred embodiment of the invention illustrated in FIG. 1, the direction of the flow of atmosphere stream 25 through the part of heat wheel 30 not occupied by heat inlet and outlet ducts 42, 50, is in the same direction as the flow of heated atmosphere stream 26. However, for better heat isolation purposes (and to assist in removal of particulates which may not be firmly embedded in the activated carbon during adsorption), as will be discussed below, it is preferred that the heat streams be countercurrent one another and the preferred embodiment will actually position heat inlet duct 42 on exit face surface 32 of heat wheel 30 with heat outlet duct 50 confronting entrance space surface 31 of heat wheel 30.

Heat outlet duct 50 also has an exiting end which is in fluid communication with an intake manifold 53 of engine 20. Heated atmosphere stream 26 in heat outlet duct 50 has VOC's present and the VOC's are treated in the emission system provided with vehicle 10. The emission system of vehicle 10 includes a catalytic converter 55. For purposes of this invention, it is to be understood that catalytic converter 55 oxidizes certain emissions such as HC's and carbon monoxide to produce "benign" emissions while also reducing other emissions such as NOx to nitrogen and oxygen. Emission systems can be complex and can include a number of catalysts besides catalytic converter 55, such as a close-coupled catalyst designated generally by reference numeral 56. By plumbing exiting end of heat outlet duct 50 into intake manifold 53, it should be clear that the VOC's are, in the end, being purified by catalytic converter 55. That is, the hydrocarbons present may be utilized by engine 20 as fuel during the combustion cycle of the engine but the engine exhaust passing through catalytic converter 55 processes any VOC's not converted in engine 20. The invention, therefore, contemplates in an alternative embodiment that the exiting end of heat outlet duct 50 can alternatively be secured to the exhaust system upstream of catalytic converter 55, preferably, being attached (not shown) to exhaust gas manifold 47. Still further, the exiting end of heat outlet duct 50 could be attached to both intake manifold 53 and exhaust manifold 47. In all instances, the VOC's and any other emissions present in heat outlet duct 50 are eventually treated by catalytic converter 55 if not reacted sooner into harmless gaseous emissions.

B) The Heat Wheel

Figure 3:
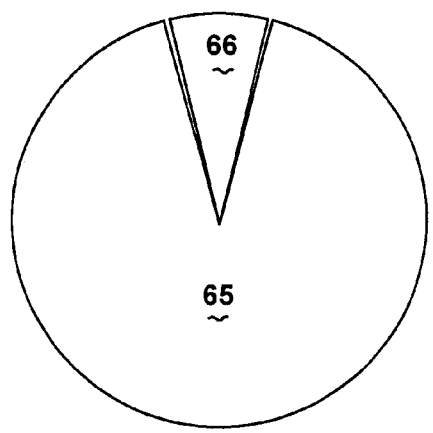
FIG. 3 is a schematic front view of the dust sections and wheel portions of the present invention.
Figure 4:
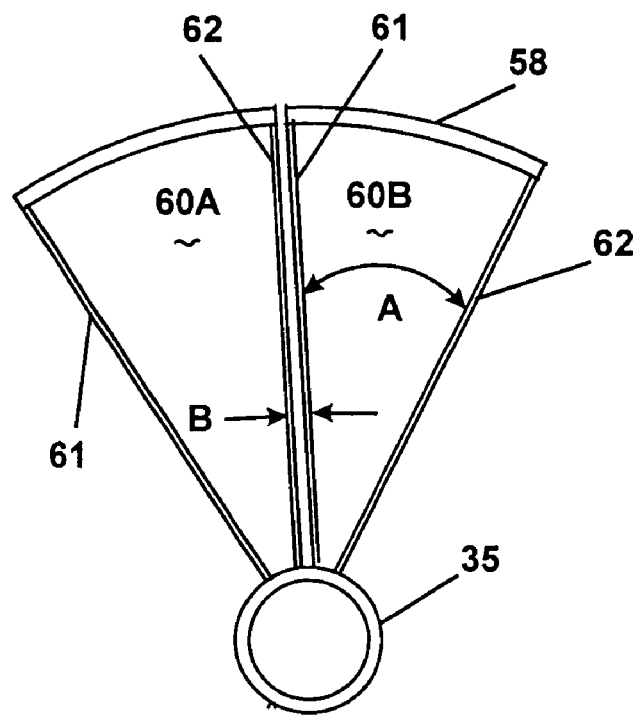
FIG. 4 is a schematic representation of a portion of the heat wheel construction.

Referring now to FIGS. 2, 3 and 4, the general structure and system arrangement will be discussed. Heat wheel 30 extends radially outward from an axially extending cylindrical hub 35 (which, as noted, is mounted to a rotatable shaft for rotation by motor 38) to a circumscribing band 58. Between hub 35 and outer band 58, heat wheel 30 is separated into a plurality of arcuate (i.e., "pie-shaped") segments 60. In the preferred embodiment, there are 10 such segments, but in FIG. 2, for drawings symmetry, there are 12 segments shown (the segments can vary in number depending on application) designated 60A–60L. As best-shown in FIG. 4, each arcuate segment 60 is defined by a radially extending leading edge wall 61 angularly spaced from a radially extending trailing edge wall 62. Edge walls extend axially the length of heat wheel 30 and define pie-shaped compartments or arcuate segments 60A–60L as shown. In the preferred embodiment, each arcuate or pie shaped segment extends an included angle which extends between radially extending edge walls 61, 62 as designated by reference letter "A" in FIG. 4. As shown in FIG. 4, there is a gap designated "B" in FIG. 4 between trailing edge wall 62 of one arcuate segment (60A) and the leading edge wall 61 of an adjacent arcuate segment (60B) In the embodiment illustrated in FIG. 4, space B is shown as parallel so that leading and trailing edges 61, 62 are not truly radial. Alternatively, gap or space "B" could be pie shaped and leading and trailing radial edges 61, 62 would then be true radial edges extending from the center of heat wheel 30. It is preferred to minimize heat conduction effects within heat wheel 30, to keep gap "B" constant. Accordingly, as used herein, "radial" means approximately radial as well as "true" radial lines extending from the center of hub 35. Gap "B" reduces included angle "A" of each arcuate segment 60. In the preferred embodiment of 10 segments, each segment would have a theoretical included angle "A" of 36°, but in practice, have angles of 30–32°.

Within each arcuate segment, adsorber composition will be coated onto the substrate as defined below. In the preferred embodiment, a monolith structure will be described which is preferred for several reasons. However, in the broader scope of the invention, pellets, granules, or even fibrous material such as fibrous cloths or mats, coated with an adsorber composition can be utilized in the sense that each compartment can be filled with such pellets, granules or fibers so long as the flow channels occurring between the spaces of the pellets, granules or the fibers do not give rise to a significant pressure drop tending to restrict the flow of atmosphere stream 25 or heated atmosphere stream 26 therethrough. For consistent terminology, "channels" when used herein mean any space extending through heat wheel 30, no matter what its path, and includes spaces between granules or particles, spaces within fibrous materials and formed spaces in monolith structures as well as the spaces defined by geometric or honey combed configurations in monolith substrates in the preferred embodiment.

Referring now to FIG. 3, there is shown the general shape of exit end 46 of heat inlet duct 42 or entry end 51 of heat outlet duct 50 which occupies one arcuate segment 60 of heat wheel 30. The large pie shaped portion remaining as shown in FIG. 3 represents what will be termed herein as a first position dependent portion of heat wheel 30 and the small pie shaped portion designated by reference numeral 66 represents what will be termed herein as the second position dependent portion of heat wheel 30. It should be clear with reference to FIGS. 2, 3 and 4, that the atmosphere stream flows are into or out of plane of the drawing. At any given time, and as will be explained further below with regard to the rotation of heat wheel 30, one of the arcuate segments 60A–60L will occupy a second position dependent portion of heat wheel 30 while all the other arcuate segments 60A–60L will occupy a first position dependent portion of heat wheel 30. Insofar as an understanding of the invention is concerned, it is important to note that atmosphere stream 25 travels through first position dependent portion 65 of heat wheel 30 while heated atmosphere stream 26 passes through second position dependent portion 66 of heat wheel 30. In the preferred embodiment, the temperature of heated atmosphere stream 26 passing through second dependent portion 66 will vary anywhere from about 150° C. to 300° C. as a result of variations in the exhaust gas temperature which will occur when the engine is placed under varying load conditions such as when it is accelerated, climbing a hill, etc. Temperature of atmosphere stream 25 which has entered engine compartment 12 will generally be considered as being at engine compartment ambient temperature which is normally estimated at about 50° C. However, the engine compartment temperature can be anywhere from outside ambient temperature during initial vehicle operation (i.e., in cold climates −10° C.) to higher temperatures depending on outside ambient and engine operating conditions which can reach 120° C. and in some localized areas of engine compartment 12, as high as 140° C. Thus, the differential in heat between first dependent portion 65 and second position dependent portion 66 of heat wheel 30 can normally range anywhere from 100° C. to 250° C. when the sensible heat of exhaust gasses are used as the means for providing the regeneration temperature for the adsorber used in heat wheel 30 and much more or much less than this under certain operating conditions. Again, in accordance with the broader scope of the invention an external heat source can be applied to heat inlet duct 42 to provide a regeneration temperature which will not vary significantly. Those skilled in the art will recognize that if the variation between the regenerative temperature and the operative adsorbing temperature is maintained relatively constant or within relatively consistent temperature ranges, the choice of materials for the adsorber becomes less critical and the performance of heat wheel 30 can be optimized. As noted above, it is one of the features of the invention in the preferred embodiment to utilize exhaust gas sensible heat. It is also one of the purposes of the invention to provide a system with minimal moving parts insofar as controlling the flow of atmosphere streams are concerned. That is, there is no attempt to control temperature by moving or valving atmosphere streams. The system as described ideally meets this requirement. There is no impediment to the flow of the atmosphere stream 25 into and out of heat wheel 30 and inlet and outlet heat ducts 42, 50 isolate heated atmosphere stream 26 from atmosphere stream 25 without the use of baffles, valving, flow restrictors, etc. Having said this, it is recognized that a baffle may be placed at inlet end 43 of heat inlet duct 42 to prevent flow of the relatively cool atmosphere stream 25 over exhaust manifold 47 until engine 20 reaches operating temperature or in the event the engine reaches an overheat condition whereat the temperatures of heated atmosphere stream 26 could exceed 300° C. This is optional and does not affect the steady state operation of the system once engine 20 reaches normal operating temperature.

Figure 5:
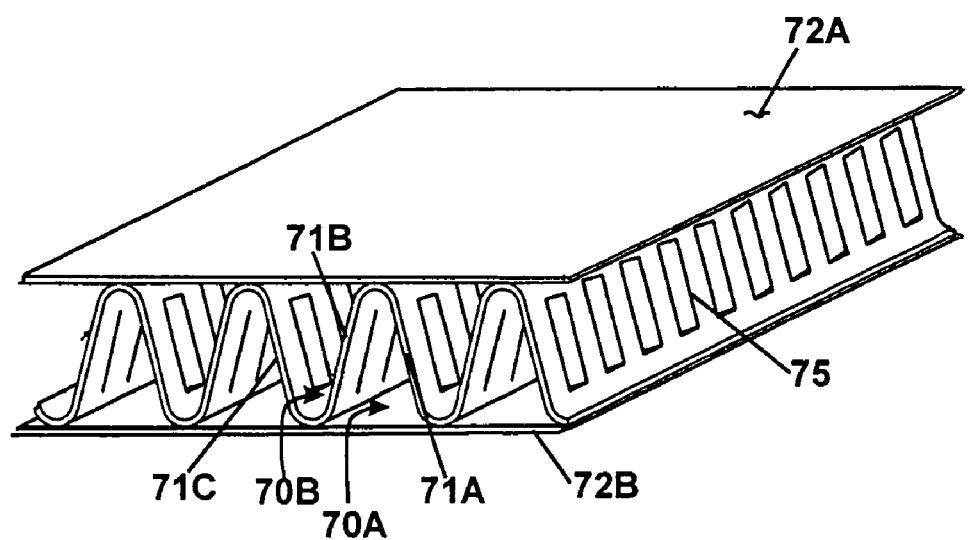
FIG. 5 is a schematic depiction of the channels formed in the heat wheel.

As noted, a plurality of channels axially extending the width or depth of heat wheel 30 are formed in each arcuate segment 60, a portion of the channels shown for arcuate segment 60A, 60B in FIG. 2. In the preferred embodiment, the channels 70 are formed in a honeycomb pattern of any geometric shape and they are characterized as a "species" of "channel" by axially extending channel walls (running the width of heat wheel 30) which are joined to form a closed pattern with each wall having one surface defining a portion of any given channel and its opposite surface defining a portion of an adjacent channel. The honeycomb pattern, desired for use in the preferred embodiment, is best shown in FIG. 5 and includes a serpentine wall 71 sandwiched between arcuate walls 72 which, for drawing illustration purposes, are shown as flat but which, in fact, are slightly curved as indicated in FIG. 2. As shown in FIG. 5, channel 70A is formed by wall surfaces of wall portions 71A, 71B, 72B and 72A (although 72A is at the apex of serpentine wall 71). Adjacent channel 70B is formed with the opposite wall surface of wall portion 71B and includes wall portions 71C, 72A and 72B (72B at the apex of serpentine wall 71). Spaced along the length of serpentine wall 71 is a plurality of slits or louvers 75. Louvers 75 provide fluid communication between adjacent channels 70 and assure contact of air streams flowing through channel 70 with arcuate wall 72 and serpentine walls 71. The configuration of channels 70 in the preferred embodiment represented in FIG. 5 is fundamentally the shape of a conventional radiator core. Walls 71, 72 are preferred aluminum (although a ceramic or plastic material could be used) and serpentine walls 71 are of a foil gauge thickness with arcuate walls 72 slightly thicker since they fundamentally function as a support and closure of serpentine walls 71. The channel construction generally illustrated in FIG. 5 has proven itself to be automobile durable and is lightweight. Importantly, the pressure drop of air flow through channels 70 is not significant while louvers 75 assure the desired air-surface contact required for this application.

In accordance with the broader scope of this invention, walls 71, 72 forming channels 70 are coated with any adsorbent composition capable of adsorbing VOC's, principally hydrocarbons, and which do not employ an oxidizing catalyst for reacting the hydrocarbons such as catalysts formed of the platinum group metals. The adsorbers can be selected from the group consisting of zeolites, cordierites, active carbons, carbon molecular sieves (activated carbon being a species thereof), mesapore solids such as mobile MEM41, silica gels, silica aluminum and microporous solids such as that formed to run from, for example, silica, aluminum, titanium, cobalt, zine or phosphorous besides zeolites. Preferred zeolites are beta zeolites and dealuminated Zeolite Y. Preferably, zeolites have a porosity sufficient to adsorb large-molecule VOC's such as toluene, zylene, stearic acid and decanol as well as small-molecule VOC's such as ethylene, propylene, ethanol, and acetone. In addition, the adsorbing material will adsorb particulate matter such as particulate hydrocarbon, soot, pollen, bacteria and germs.

C) Heat Wheel Rotation and OBD

In accordance with the broader aspect of the invention, atmosphere stream 25 passes through first position dependent portion 65 of heat wheel 30 where the VOC's are adsorbed as atmosphere stream 25 contacts the desorbant material in channels 70. Eventually, the adsorbant composition becomes saturated with VOC's in first position dependent portion 65 and there must be some mechanism provided for desorbing the VOC's collected within the molecular structure of the adsorber. This is accomplished by sequentially rotating, arcuate segment by arcuate segment 60A–60L into second position dependent portion 66 of heat wheel 30 whereat heated atmosphere stream 26 causes, by its higher temperature, a desorption of VOC's in that segment. The desorbed VOC's are then treated by the engine exhaust system as discussed above.

There are several factors controlling the segmented rotation of heat wheel 30 addressed by this invention. In the normal heat transfer of a classic heat wheel application, channels 70 would typically span a larger distance than one wheel segment (there would be no wheel segments) and the channels would be heated in their second dependent position so that heat from the channels could be given the air streams flowing through the first dependent portion of the heat wheel. Such heat transfer arrangement could not be tolerated in the present invention because if the heat in the second position dependent portion of the heat wheel is such as to cause a substantial heating of the channels 70, the heat in the serpentine and arcuate walls 71, 72 would prevent, deter or retard the ability of the adsorbing composition to adsorb VOC's when any specific arcuate segment 60 was rotated from the second position dependent portion to the first position dependent portion of heat wheel 30. In theory, this invention desires to heat the adsorbing material to a temperature whereat the VOC's can be desorbed without heating the substrate, i.e., channel walls 71, 72 so that when the regenerated but heated arcuate segment passes into the first position dependent portion of the heat wheel, it can immediately begin adsorbing VOC's. In practice, channel walls will be heated and the object is to avoid the heat spreading to adjacent arcuate segments and avoiding peaking of temperatures within channel walls 71, 72. That is, serpentine walls 71 are chosen as a foil and will be heated by heated atmosphere stream 26 but the heat will dissipate rapidly when the heated segment is rotated into the first position dependent portion of the wheel. Thus, the heat isolation characteristics achieved in the invention results not only from the design of heat wheel 30 as discussed but also by the sequencing routine used which dictates the time at which any segment remains in the second position dependent portion of the wheel.

Indexing the wheel at a correct time is thus critical to maintain the wheel function not only to desorb VOC's, but also to prevent the heat from unduly interfering with the ability of the heat wheel to adsorb VOC's, i.e., permitting the heat wheel to achieve its isolation design affect. It is possible to model a programmed routine based upon a standard or prototype heat wheel 30. This routine can calculate an index time based upon the time it takes to desorb a saturated arcuate segment 60 of heat wheel 30 using look tables, for example, which determine or calculate the index time based on the temperature of heated atmosphere steam 26, (also optionally and also the temperature of atmosphere stream 25) and an aging factor.

While the invention can function with such a programmed routine, this invention achieves the desired indexing or timing by the provision of a hydrocarbon sensor, specifically a calorimetric sensor 80 in heat outlet duct 50. Calorimetric sensor 80 detects the hydrocarbons present in heated atmosphere stream 26 after it leaves heat wheel 30. Fundamentally, when the hydrocarbons cease being detected, the wheel is indexed. However, it is to be appreciated that the hydrocarbons present (after the initial release) even in the desorbed heated atmosphere stream 26 are a fraction of the hydrocarbons emitted from engine 20. Furthermore, in the normal exhaust emission system, oxygen sensors are used to control engine fueling which are more robust despite the presence of hydrocarbon systems in the literature. It has been found, however, that a calorimetric sensor of the type disclosed herein is able to detect hydrocarbons in the range of several ppm's. A sensor of this calorimetric type is able to detect the rate of change of the VOC's desorbed in the second heated portion 66 of wheel 30 during the regenerative cycle and it has the sensitivity necessary to determine when the arcuate segment has been fully desorbed. Accordingly, this invention uses calorimetric hydrocarbon sensor 80 to determine the time at which the heat wheel indexes its arcuate segments into and out of the second position dependent portion 66 of heat wheel 30.

It also must be noted from a system concept, calorimetric sensor 80 is positioned in heat outlet duct 50 to determine completion of desorption by failing to detect the presence of hydrocarbons. In theory, indexing control could be achieved by placing calorimetric sensor 80 in the path of cleansed atmosphere downstream of first position dependent portion 65 of heat wheel 30 such that indexing occurs when hydrocarbons are sensed in the air stream thus indicating adsorption saturation of heat wheel 30. If wheel 30 is indexed on this basis, the desorption or a percentage of the desorption will float and eventually the wheel will continuously rotate. Importantly, it has been determined that if the adsorber is the preferred zeolites discussed above or the activated carbon to be discussed in detail below, the time to desorb an arcuate segment 60 at the temperature ranges under consideration (150° C.–300° C.) is less than the time it takes for arcuate wheel segment 60 to become saturated with VOC's in the adsorbtion stage. It is thus a specific feature of the invention to control the indexing of heat wheel 30 by a hydrocarbon sensor, specifically calorimetric sensor 80, in heat outlet duct 50.

In its simplest form, the programmable routine used by ECU 40 can simply comprise the detection of an "absolute" signal value from calorimetric sensor 80 indicative of a set value of VOC's detected by calorimetric sensor 80 which is a minimum value at which heat wheel 60 is indexed (or alternatively the absence of any VOC's detected by calorimetric sensor 80). By way of explanation, the desorption of the VOC's from an arcuate segment 60A–L rotated into second position dependent portion 66 of heat wheel 30 initially results in the release of a large quantity of VOC's that produces a spike or a peak in the quantity of VOC's emitted and the quantity then decays or diminishes as a function of time. If a graph of VOC's desorbed over time were plotted, the trace would resemble, for example, a scintillation event detected by a photomultiplier in a nuclear camera. There would be a steep initial rise of the trace to a peak followed by an asymptotic or sine shaped decay portion of the trace eventually leveling off at a theoretical value of zero VOC's. For heat transfer, cycle time and efficiency considerations, an absolute value indicative of some diminishing value reached on the decay or tail portion of the VOC trace is selected at which the wheel indexes.

Another programmable routine can be utilized to compare sensor signals over time to determine rate of change and when rate of change diminishes to a set value, indicative of some portion of the decay curve, the wheel is indexed. For example when the tail of the trace starts to level out, ECU 40 will signal motor 38 to index.

Yet, another programmable routine can detect the peak quantity of desorbed VOC's by implementing, for example, a dv/dt routine, common in scintillation event detection and then use look up tables correlated to the peak or spike detected from which a fixed time for cycling can be extracted.

Any of the cycling programmable routines described above can be utilized in combination with fail safe routines, if desired, which can override the normal cycle program in the event an unusual condition is sensed. For example, ECU 40 is normally supplied with exhaust gas temperature information either from sensors present in vehicle 10 or from programmed routines normally executed by ECU 40 to control fueling of vehicle 10. A look-up time-temperature table can be constructed which will override the programmed cycle routine if a command to index heat wheel 30 is not received when a high exhaust gas temperature has been sensed for a set time.

Importantly, the calorimetric sensor can function as a device for use in an OBD (on board diagnostic) system. Existing and contemplated environmental regulations recognize that a vehicle can function to cleanse the atmosphere as well as pollute the atmosphere. Automotive manufacturers are, or will be, given credits for vehicles which cleanse the atmosphere and those credits may be used to offset the emissions produced by internal combustion engine 20. Ideally, a vehicle may "cleanse" the atmosphere by an amount equal to that at which it "pollutes" the atmosphere resulting in environmentally safe vehicles. However, whatever device is used by the vehicle to cleanse the atmosphere, emission regulations provide the device must have a system on the vehicle to sense whether the cleansing device is functioning and to signal the operator when the cleansing device is malfunctioning such as shown by warning indicator light schematically represented in FIG. 1 by reference numeral 100.

Calorimetric sensor 80 is ideally suited to accomplish this function by monitoring the ability of the adsorbing material coated onto channels 70 to release the adsorbed VOC's when channels 70 in an arcuate segment 60A–L are rotated into a second position dependent portion 66 of heat wheel 30. Calorimetric sensor is suited to such an application because:

1) It has a high sensitivity to low ppm levels of hydrocarbon resulting not only from its inherent construction but also because in the VOC application a) sensor 80 can be positioned in heat outlet duct 50 at a location whereat the temperature of heated atmosphere stream 26 has dropped to a low level (that is, the temperature of heated atmosphere stream 26 is less than that of the exhaust gas application for which the sensor was developed and positioning calorimetric sensor 80 remote from entry end 51 of heat outlet duct 50 results in a further temperature drop which allows the sensor heaters, described below, to accurately control the temperature of the sensor as described below to produce sensitive, accurate HC readings.) and b) heated atmosphere stream 26, by definition, has an excess of oxygen that is more than sufficient to provide the catalytic reactions needed by calorimetric sensor 80 to provide the sensitive readings desired and c) the flow rate of heated atmosphere stream 26, while variable, is still relatively constant when compared, for example, to the exhaust gas application for which the sensor was developed.

2) Calorimetric sensor 80 has a rapid response resulting from the electrical resistance signals developed by the sensor as described below such that the "peak" or "spike" of the VOC trace described above can be detected.

3) Calorimetric sensor 80 is robust and durable because it is positioned in heat outlet duct 50 at what is considered a low temperature environment and heated atmosphere stream 26, while containing VOC's and other matter is not as harsh as other gaseous compositions, for example the exhaust gases of the vehicle.

4) Calorimetric sensor 80 is relatively speaking, an inexpensive device, and as indicated in the schematic of FIG. 1 is relatively simple to implement in a system controlled by the vehicles' ECU 40.

Notwithstanding the unique characteristics of a calorimetric sensor, in accordance with the broader scope of the OBD inventive aspects of the invention, an OBD system, using a conventional hydrocarbon sensor, can detect a failure of heat wheel 30 using a programmable routine implemented by ECU 40 to actuate alarm 100. As noted above, when an arcuate segment 60A–L is rotated into the heated, regeneration zone a spike or peak of VOC's are released and a hydrocarbon sensor of conventional construction normally can detect this peak. Thus the programmed routine can simply actuate warning indicator 100 when peaks are not detected for "x" number of successive segments. The heat wheel 30 has failed and the failure triggers the warning as required. The conventional hydrocarbon sensor while capable of functioning as a failure device would not have the sensitivity to control indexing of the wheel nor could it be used to indicate how much wear or how much life remained in the wheel.

Using calorimetric sensor 80 the failed routine can be programmed as described or the routine can be programmed to trigger a failure when "x" number of successive arcuate segments 60 fail to achieve a set level of released HC's (absolute value) within a set time. Alternatively, failure can occur if a rate of change of signals is not within a set range within a set time period.

Importantly, the sensitivity of calorimetric sensor 80 is such that a desorption trace can be recorded. A number of more sophisticated programmable routines can thus be implemented by ECU 40 to determine the efficiency of heat wheel 30 as it ages. The programmable routine can integrate the trace over a set time or the amplitude of the peak sensed or the leading edge and trailing edge of the peak differentiated. The values obtained can be stored in memory and compared over time (aging) to determine efficiencies at which heat wheel is effective to adsorb VOC's. The efficiency thus obtained is relative in that the efficiency detected is compared to that which the heat wheel had when new.

Still further, it is possible to program a routine which determines an absolute efficiency based on sensor input. For example, the exhaust gas temperature can be sampled as discussed above and the atmosphere flow calculated from the airflow in intake manifold 53 and an ambient temperature assumed or sensed. With these sensed parameter inputted into stored look up tables and the like in ECU 40 an characteristic of an ideal or true VOC trace can be generated. This VOC desorption trace (or characteristic of the trace) can be compared to the sensed, calorimetric sensor generated VOC trace (or characteristic thereof) to determine an actual sensed efficiency. If emission "credit" regulations should require an OBD system to ascertain the efficiency of an atmosphere purification system, sensor readings from calorimetric sensor 80 can be utilized to provide such a system.

It is noted that the OBD routines and the wheel indexing routines described are not mutually exclusive. That is, one aspect of the invention contemplates using any of the OBD routines described in any heat wheel coated with any adsorber to assure compliance with emission regulations requiring an atmosphere cleansing system to have a vehicular system advising the operator when a failure of the atmosphere cleansing system has occurred. Another aspect of the invention contemplates using any of the index routines discussed above to cause accurate and timely rotation of an atmosphere cleansing system using a heat wheel coated with any adsorber and using any type of OBD system to detect failure of the system. However, a particularly important aspect of the invention is the use of calorimetric sensor 80 to control indexing of heat wheel 30 while also providing an OBD system capable of meeting existing OBD regulations as well as contemplated OBD regulations which may occur in the future.

The programmable routines used in the invention have been described only functionally herein because it is believed, one skilled in the programming art, will not have difficulty in constructing such routines given the function stated above and the parameters to be measured and implemented as noted. Accordingly, flow charts describing the routines further are not believed necessary to understanding and implementing this aspect of the invention described herein.

Figure 6:
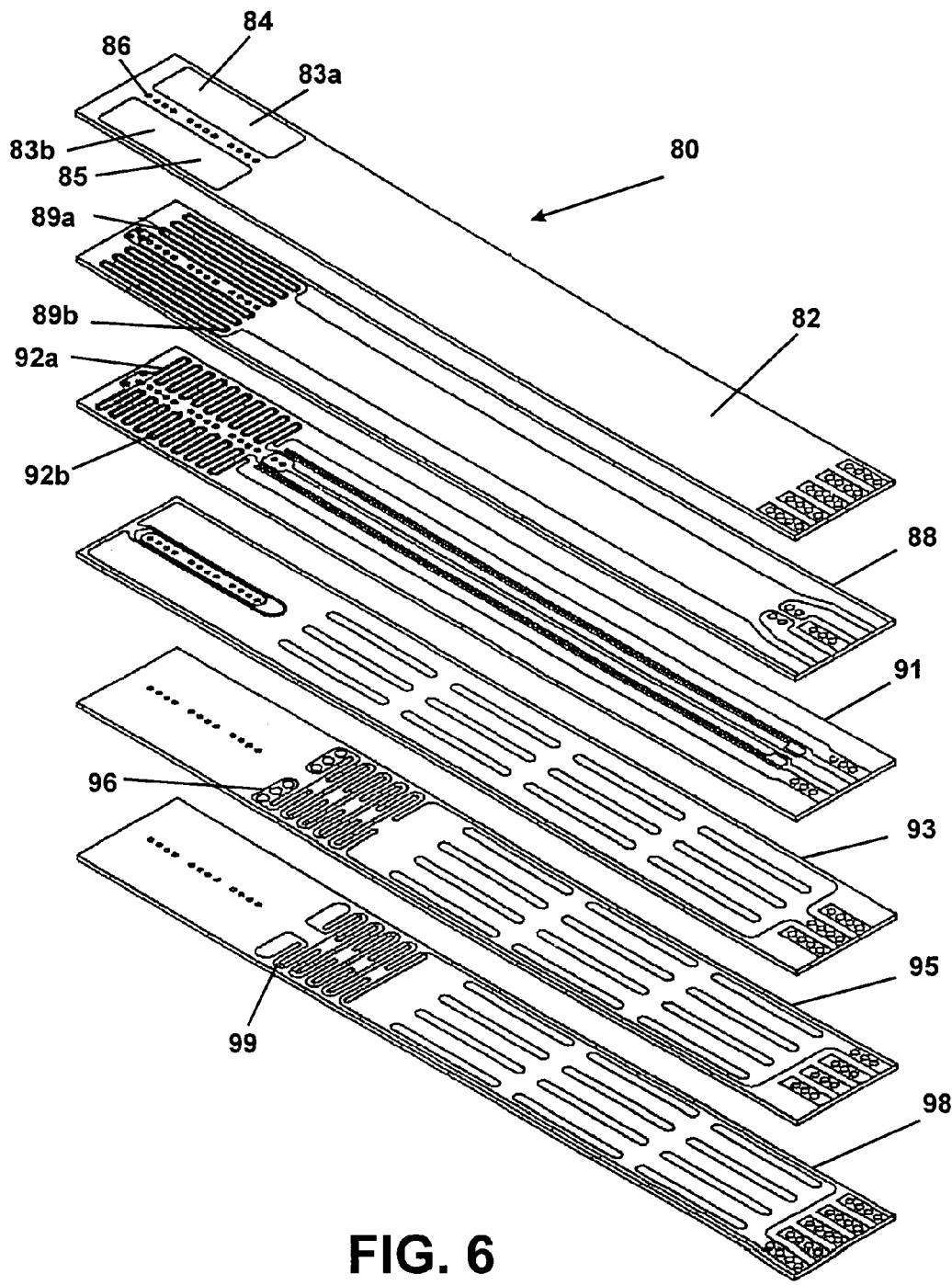
FIG. 6 is a representation of the calorimetric sensor used in the inventive system.

Referring now to FIG. 6 there is generally shown in perspective view only a substrate portion of calorimetric sensor 80 which is believed sufficient to show how sensor 80 functions to generate the signals used in the invention. Not shown is an electrochemical "oxygen pump" which is secured to and situated under the substrate shown in FIG. 6. This electrochemical pump is an electrolyte such as yttrium stabilized zirconia having inner and outer electrodes so that when a voltage is placed across the electrodes, oxygen ions (resulting from oxygen compounds in heated atmosphere stream 26) travel across the electrodes to enter the substrate configuration disclosed in FIG. 6 and provide oxygen for exothermic oxidation reactions. As noted above, this is not necessary in the VOC application because heated atmosphere stream 26 has excess oxygen. Also not shown in FIG. 6 is a diffusion barrier surrounding at least the top portion of the substrate illustrated in FIG. 6 which limits the amount of heated atmosphere stream 26 sensed by the substrate but does not change the composition of the concentrations of gaseous emissions present in heated atmosphere stream 26.

The multi layered substrate (which essentially makes up calorimetric sensor 80) comprises a plurality of ceramic layers which, with the exception of top layer 82, supports screen-printed metalization defined in different patterns to form the various functional elements necessary to measure and control temperature within calorimetric sensor 80. More specifically, top layer 82 is shown for discussion purposes only, to have two active regions 83a, 83b. In one embodiment of the invention and in one active region, a first catalyst 84 is disposed and in the other region, a second catalyst 85 is disposed. Between regions 83a and 83b is a plurality of vias 86 through which oxygen generated by the electrolyte discussed above diffuses. Vias 86 are present in each one of the layers for oxygen flow to the catalysts. Immediately beneath top layer 82 is first intermediate layer 88 which has resistance temperature devices (RTDs) 89a, 89b underlying active regions 83a, 83b respectively. Underlying first intermediate layer 88 is a second intermediate layer 91 which contains resistance heating elements 92a, 92b underlying first and second active regions 83a, 83b respectively which will hereafter be termed compensation heater 92. A third intermediate spacer element 93 is provided and underneath third intermediate layer 93 there is a fourth intermediate layer 95 containing a primary heating element 96 and a fifth or bottom layer 98 also containing a primary heating element 99.

In operation, voltage is applied to primary heating elements 96, 99 to bring calorimetric sensor 80 to a predetermined stable temperature as measured by one of the RTDs 89a or 89b. As exothermic reactions develop on catalyst surfaces 84, 85 different temperature rises occurring over regions 83a, 83b will be sensed by RTDs 89a, 89b. To compensate for the rises detected by RTD's 89a, 89b, an applied voltage will be supplied (actually reduced) compensation heaters 92a, 92b to bring RTD readings 89a, 89b into balance. This power adjustment necessary to return RTDs 89a, 89b to equal resistances (temperatures) is proportional to the difference in the exothermic oxidation heat generated by the reactions promoted vis-a-vis catalysts 84, 85. Reference should be had to U.S. patent application Ser. No. 08/970,837, filed Nov. 14, 1997, entitled "Calorimetric Hydrocarbon Gas Sensor" for a detailed description and showing of the specific circuitry utilized to raise the temperature to bring active regions 83a, 83b into balance with one another.

Standard practice is to apply a non-reactive type catalyst to one of the active regions 83a, 83b and which functions as a reference signal while an active catalyst is applied to the other active region 83a or 83b. As to the composition of the catalyst for first and second catalyst 84, 85, reference should be had to U.S. patent application Ser. No. 08/970,259, filed Nov. 14, 1997, entitled "Exhaust Gas Sensor" which defines a number of catalyst compositions which can be utilized to promote selected exothermic oxidation reactions. Insofar as the heat wheel application is concerned, one area 83a or 83b could be coated with a CMS (carbon monoxide selective) selective catalyst and the other area 83b or 83a could be coated with a catalyst capable of sensing all combustibles (HC, CO, $H^2$) such as a platinum rhodium catalyst impregnated into a prestabilized alumina. Subtracting the total combustibles signal from the COS catalyst signal yields an HC signal. Preferred, however, is to simply coat one area, 83a or 83b with a catalyst capable of detecting all combustibles and leaving the other area, 83bor 83, uncoated or coated with a non-reactive material. The selective gas differentiation ability of calorimetric sensor 80 is mentioned should governmental regulations require detection of a specific gas. In such event, the programmable routines used with the sensor can give total combustibles as well as gas specific readings.

Insofar as the total combustibles catalyst is concerned, a catalyst 84 applied to active region 83a comprises active metal components such as one or more of the following elements: platinum, rhodium, palladium, iridium, and ruthenium. Generally, platinum, rhodium and palladium are preferred. These active metals are preferably supported on a stable refractory support such as alumina, zirconia, titania, silica, silica alumina or other similar ceramic materials. High surface area materials such as gamma alumina are preferred. Optionally, an oxygen storage material such as ceria may be added to the catalyst formulation. However, this material is not essential because heated atmosphere stream 26 has more than sufficient air or oxygen. Thus, even more preferred are refractory materials that are especially stabilized by thermal, geothermal or chemical means, such as precalcined alumina and ceria stabilized zirconia. The particle size of the catalyst should be such that a binder can be used to adhere the catalyst formulation. In addition, the particle size and uniformity of the catalyst should be such that the processes for catalyst deposition, such as screen printing, are feasible. In general, the mean particle size of the catalyst material should be less than ten microns in diameter with a more or less normal distribution about that mean. More preferred is a mean particle size of approximately 5 microns in diameter.

D) The Adsorber

D1) The Activated Carbon.

A particularly important aspect of this invention is the selection of activated carbon within the ranges discussed below as the adsorber for a vehicular atmosphere cleansing system. Activated carbon is a microcrystalline, nongraphitic form of carbon, which has been processed to increase internal porosity. It is typically formed by thermal activation processes performed on carbonaceous materials such as coal, coconut shells or by the use of chemical activation agents, typically phosphoric acid, on materials such as saw dust in a kiln at elevated temperature. This invention is not limited to activated carbon made by any specific process.

Generally, the larger the surface area of the activated carbon, the greater its adsorption capacity. The available surface area of activated carbon is dependent on its pore volume. Since the surface area per unit volume decreases as individual pore size increases, large surface area is maximized by maximizing the number of pores of very small dimensions and/or minimizing the number of pores of very large dimensions. Pore sizes are defined by the International Union of Pure and Applied Chemistry as micropores (pore width<1.3 nm), mesopores (pore width=1.8–50 nm), and macropores (pore width>50 nm). Micropores and mesopores contribute to the adsorptive capacity of the activated carbon; whereas, the macropores reduce the density and can be detrimental to the adsorbant effectiveness of the activated carbon, on a carbon volume basis. The adsorption capacity and rate of adsorption depend to a large extent upon the internal surface area and pore size distribution. This invention is limited to activated carbon having pore sizes defined as substantially micropores, Substantially micropore porosity means about a majority of the pore size, approximately 50% or better, have micropore porosity. While definitive testing has not been conducted, it is believed, based on the activated carbon samples which have given good testing results, that about 50% of the porosity is of micropore size, about 40% is of macropore size and the balance, about 10%, is of mesapore size. It is preferred that porosity of the activated carbon which does not comprise micropore size be substantially, or in excess of 50%, macropore size.

The function of the inventive system is to remove hydrocarbons/VOC's (HC) from ambient air. The HC's typically found in ambient air consist mostly of alkanes, alkenes and aromatics. The removal of these materials from the air is accomplished by use of an adsorbent. The adsorbent functions in the following manner. The adsorbent removes HC's from ambient air that passes over the adsorbent. The HC's are retained on the adsorbent until the temperature is raised significantly. Upon raising the temperature, the previously adsorbed hydrocarbons are desorbed and channeled to a collection device that routes them to the engine air intake. Preferably, the collection device is a duct, such as heat outlet duct 50 described above. The HC's are then mixed with fuel and burned in the engine.

The adsorbent is supported on a suitable substrate, which is a mechanical device of high geometric surface area that can allow large volumes of air per unit time to pass through the substrate. This substrate must be able to withstand, without failure, the temperature swing necessary for adsorption and desorption. This device must have a relatively low pressure drop and be compatible with the other elements of the automobile design. One design for the substrate is a porous wheel described as heat wheel 30 discussed above. To desorb the retained HC all or part of the wheel must be heated at certain time intervals. If only a portion of the wheel is heated at one time in a regeneration section, then the wheel must rotate so that over a period of time the entire wheel experiences an elevated temperature. Alternatively the regeneration hardware (heat inlet and outlet ducts 42, 50) must move to different sections of the wheel. Normally it is more convenient to have the wheel rotate.

Thus the net effect is that the adsorbent is coated on a porous substrate through which large volumes of ambient air are passed. The porous substrate is located under the hood in the engine compartment. The temperature of the air under the hood is likely to be in the vicinity of 50° C. due to heat from the engine and other equipment in the car. After a certain period of time, based on the sorbent capacity, the temperature, the concentration of hydrocarbons in ambient air and other factors, the adsorbent becomes saturated or nearly saturated and is ready for regeneration. A section of the wheel rotates into the regeneration area. Hot air is supplied to this section in order to drive the adsorbed HC off the sorbent. The flow of this regeneration air can be co-current or counter current to the adsorptive flow. It is preferred that the flow be counter current. The required heat can be obtained from any convenient source such as the engine exhaust or an external heating device. The temperature used to desorb the hydrocarbons depends on the adsorbent type, the type of HC adsorbed, the available heat source etc. However, the temperature will generally be in the range of 150 to 300° C.

Thus the process involves adsorption of HC at approximately 50° C. and desorption of HC at approximately 200° C. These process steps alternate as the device is used.

In order to simulate this process conveniently in the laboratory, a laboratory test reactor was built which reasonably mimics the process to which the sorbent would be exposed. This consists of an adsorption step where a small piece of substrate coated with an adsorbent is heated to 50° C. and exposed to ppm concentrations of hydrocarbon(s) such as hexane, hexene or toluene (i.e., alkane, alkene and aromatic). Enough water is added to keep the humidity at about 50% (relative). After a certain period of time the temperature of the substrate is raised to 180–200° C. This increase in temperature results in desorption of adsorbed hydrocarbons during a regeneration step. The temperature is then reduced and the adsorption/desorption cycle is repeated as needed.

The test reactor consisted of a quartz tube containing a cylindrical ceramic monolith (400 cpsi) dimensions ¾" (diameter)×1" (height) or alternatively a small section of an automobile radiator ¾" (width)×½" (height)×¾" (depth). The substrate was coated with a sorbent to a level of approximately 1 g/in3 (of substrate volume) or less. These substrates give little or no pressure drop. The tube was placed in a tube furnace which supplied heat on demand. Gas containing known ppm levels of one or more representative hydrocarbons was passed over the substrate at space velocities (airflow rate in cc/hr divided by the volume of substrate in cc) and are similar to those expected on a sorbent wheel that would be on an automobile. The gas exiting from the substrate was routed to a hydrocarbon analyzer that was monitored continuously. A thermocouple was placed at the inlet face of the substrate. This allowed an ability to monitor the gas temperature and control the tube furnace. The experiment consisted of flowing gas containing no hydrocarbon over the coated substrate while the substrate and the gas were heated to 50° C. Then hydrocarbon was then introduced to the gas flow using calibrated mass flow controllers and analyzed gas mixtures. The HC gas was fed to the substrate for 30 min. Then the temperature was raised to 200° C. Although the HC flow continued, HC's were desorbed from the substrate. After a period of time, the temperature was cooled to 50° C. without HC flow. The adsorption and desorption cycle can be repeated as necessary.

From the known concentration of feed HC and the exit concentrations one can calculate the amount of HC picked up during the adsorption phase and the amount of HC released during the desorption phase. The variables reported for the experiment are the following:

HC used in feed (e.g., toluene, hexane, and hexene)

1) Concentration of HC in feed—(ppm as C1)
2) Size and type of substrate
3) Adsorbent type
4) Adsorbent coating level (g/in3)
5) Adsorption temperature (° C.)
6) Adsorption time (min)
7) Desorption temperature (° C.)
8) Temperature ramp rate (° C./min)
10) Time at desorption temperature (min)
11) % HC adsorbed (100*amount adsorbed/amount fed)
12) % HC desorbed (100*amount desorbed/amount adsorbed)
13) Number of cycles.

This laboratory test gives a reasonable approximation to the performance expected by an adsorbent used on a wheel.

EXAMPLE 1

This example is a control experiment demonstrating that an adsorbent is needed for adsorption of hydrocarbon and that the substrate has no adsorptive activity.

A blank monolith with no coating (i.e., no adsorbent) was placed in the reactor and heated to 50° C. Approximately 5 ppm of toluene was fed to the reactor. No adsorption was observed. The same result occurred when a radiator minicore was used (i.e., no adsorption was observed):

| Variable | Units | |
|---|---|---|
| Hydrocarbon | | Toluene |
| [HC] | ppm C1 | 5 |
| Substrate | | Monolith or Minicore |
| Adsorbent | | None |
| Loading | G/in3 | 0 |
| Adsorption Temp. | ° C. | 50 |
| Adsorption Time | Minutes | 30 |
| Desorption Temp | ° C. | NA |
| Desorption Time | Minutes | NA |
| Temperature Ramp | ° C./min | NA |
| # of Cycles | | 1 |
| % HC Adsorbed | | 0 |
| % HC Desorbed | | NA |

NA means nonapplicable.

EXAMPLE 2

In this experiment beta zeolite was coated onto a standard monolith. The results are shown below.

| Variable | Units | Results |
|---|---|---|
| Hydrocarbon | | Toluene |
| [HC] | ppm C1 | 4.43 |
| Substrate | | Monolith |
| Adsorbent | | Zeolite Beta |
| Loading | g/in3 | 1.06 |
| Adsorption Temp. | ° C. | 50 |
| Adsorption Time | Minutes | 30 |
| Desorption Temp | ° C. | 200 |
| Desorption Time | Minutes | 30 |
| Temperature Ramp | ° C./min | 10 |
| # of Cycles | | 2 |
| % HC Adsorbed | | 27 |
| % HC Desorbed | | 98 |

EXAMPLE 3

A aluminum minicore coated with activated carbon (Kreha PW) was tested for toluene adsorption. Results are contained in the table below.

| Variable | Units | Results |
|---|---|---|
| Hydrocarbon | | toluene |
| [HC] | ppm C1 | 5.06 |
| Substrate | | Minicore |
| Adsorbent | | Activated Carbon |
| Loading | g/in3 | 0.54 |
| Adsorption Temp. | ° C. | 50 |
| Adsorption Time | Minutes | 30 |
| Desorption Temp | ° C. | 200 |
| Desorption Time | Minutes | 30 |
| Temperature Ramp | ° C./min | 10 |
| # of Cycles | | 2 |
| % HC Adsorbed | | 39 |
| % HC Desorbed | | 100 |

Although the substrates are different, the activated carbon in this example shows a higher adsorption percentage than that achieved with the zeolite in Example 2.

This coated minicore was also tested for ozone destruction at three temperatures (75, 50 and 25° C.). The inlet ozone concentration was 250–290 ppb. The dew point of the inlet air stream was 15° C. The table below shows the results.

| Temperature (° C.) | Space Velocity (hr −1) | Ozone Conversion (%) |
|---|---|---|
| 25 | 400,000 | 45 |
| 25 | 800,000 | 31 |
| 50 | 400,000 | 59 |
| 50 | 800,000 | 44 |
| 75 | 400,000 | 63 |
| 75 | 800,000 | 48 |

Thus the activated carbon adsorbs hydrocarbons as well as destroys ozone. It is a dual function system.

Some additional comments are believed in order with respect to the destruction of ozone. The tests measured the ozone present which was inputted to the coated minicore and the ozone present in the atmosphere stream which left the minicore. The values quoted in the table above represent the difference. It is possible the ozone was catalyzed and reduced to $O^2$ or the ozone was adsorbed onto the activated carbon. Tests were run at different temperatures and the percentages representing "before" and "after" differences was relatively constant. This indicated that the ozone was catalyzed. If the ozone was adsorbed, lesser percentages would be recorded as the temperature increased. It is believed the activated carbon is functioning to both catalyze and adsorb the ozone, although testing has not been conducted as of the date hereof to verify this conclusion. For purposes of this invention, it is believed sufficient to note that the preceding table shows the invention is sufficient to remove ozone from the atmosphere.

EXAMPLE 4

The following example illustrates that alkanes can be adsorbed and desorbed from activated carbon (Carbochem CA-10)

| Variable | Units | Results |
|---|---|---|
| Hydrocarbon |  | Hexane |
| [HC] | ppm C1 | 4.05 |
| Substrate |  | Ceramic Monolith |
| Adsorbent |  | Activated carbon (Carbochem CA-10) |
| Loading | g/in3 | 1.0 |
| Adsorption Temp. | ° C. | 50 |
| Adsorption Time | Minutes | 30 |
| Desorption Temp | ° C. | 200 |
| Desorption Time | Minutes | 30 |
| Temperature Ramp | ° C./min | 10 |
| # of Cycles |  | 3 |
| % HC Adsorbed |  | 33 |
| % HC Desorbed |  | 100 |

EXAMPLE 5

This example illustrates that aromatics can be adsorbed and desorbed using activated carbons (SA-30)

| Variable | Units | Results |
|---|---|---|
| Hydrocarbon |  | toluene |
| [HC] | ppm C1 | 5.10 |
| Substrate |  | Ceramic Monolith |
| Adsorbent |  | Activated carbon |
| Loading | g/in3 | 1.17 |
| Adsorption Temp. | ° C. | 50 |
| Adsorption Time | Minutes | 30 |
| Desorption Temp | ° C. | 200 |
| Desorption Time | Minutes | 30 |
| Temperature Ramp | ° C./min | 10 |
| # of Cycles |  | 2 |
| % HC Adsorbed |  | 68 |
| % HC Desorbed |  | 94 ($2^{nd}$ cycle) |

EXAMPLE 6

Figure 7:
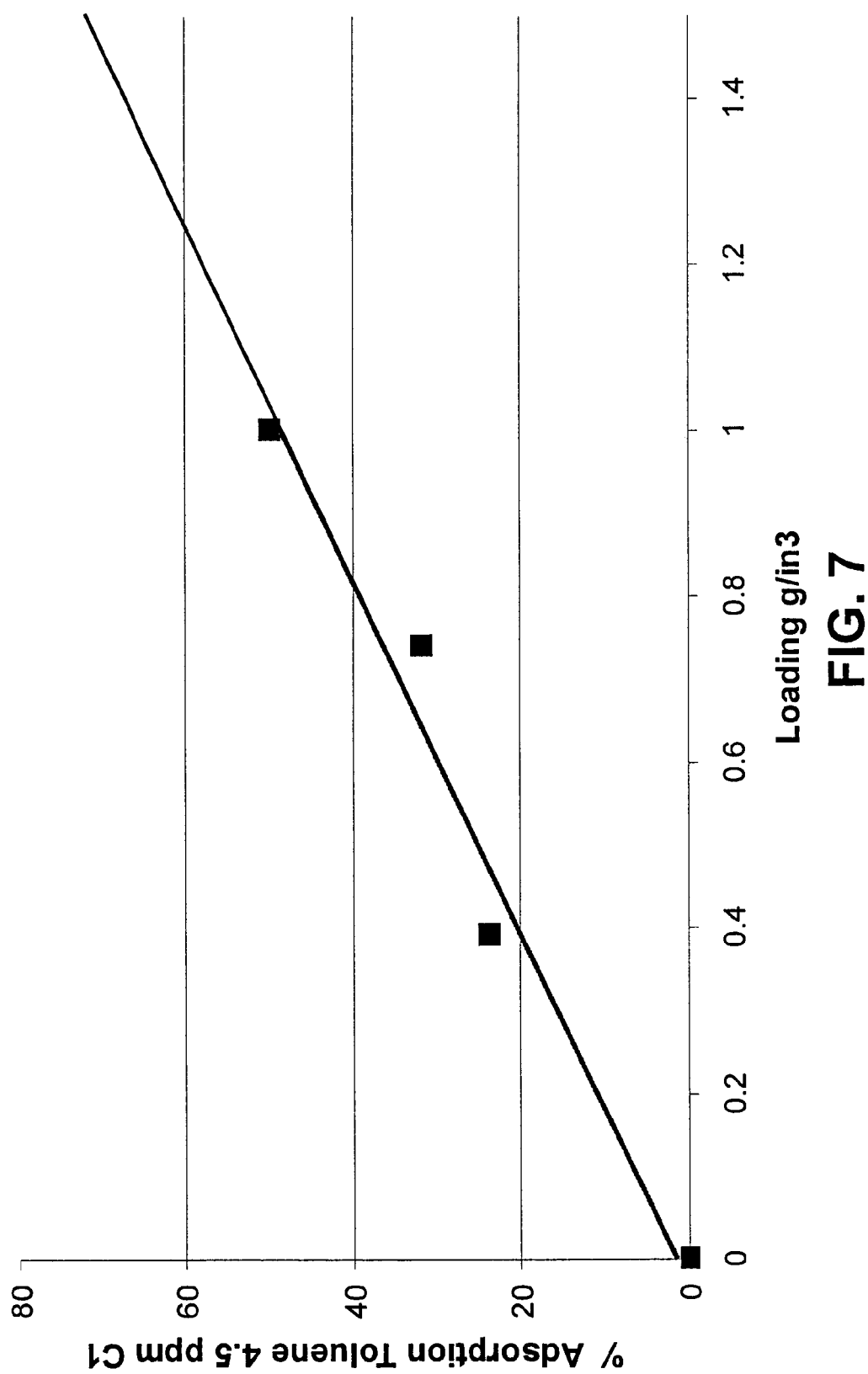
FIG. 7 is a graph showing the adsorption efficiency of activated carbon for HC as a function of its loading on a substrate.

This example illustrates that adsorption of HC is proportional to loading. A ceramic monolith was coated with carbon at several different loadings (i.e., grams of coating per unit volume of ceramic monolith substrate) and the % adsorption of toluene was determined by the methods described in the previous examples. The results for carbon PC-1 are shown as a plot of adsorption vs loading in the graph depicted in FIG. 7. The graph shows that the relationship is linear for activated carbon. The substrate for the activated carbon coating shown in FIG. 7 was cordierite having 400 cells/square inch. The substrate affects the carbon loading. Generally speaking, the more porous the substrate, the higher the loading of activated carbon which can be placed in the substrate until no further improvement in adsorption efficiency is detected, neglecting, for purposes of this statement, any consideration of the binder. Testing was not conducted for the cordierite substrate to show the position whereat further loading will not increase the adsorption efficiency. However, this limit for the aluminum foil application has been observed to occur at about 0.6 g/in$^3$. As noted above, the substrates suitable for vehicular application include metals, plastics and ceramics. Accordingly, a minimum loading resulting in acceptable adsorption efficiencies for all applicable substrates is about 0.5 g/in$^3$. Optimum loadings will vary depending on several factors including mean particle size, porosity, the binder and the substrate chosen.

EXAMPLE 7

This example illustrates that the particle size of the activated carbon affects the degree of adsorption of hydrocarbons. Carbon A had an as received mean particle size of approximately 14 microns. This material was coated onto a monolith at several loadings and the adsorption of toluene was determined by the methods described previously. Carbon A was then milled in water. The mean particle size was reduced to approximately 5 microns. This reduced size material was then coated onto a monolith and adsorption of toluene was determined by the method described previously.

Figure 8:
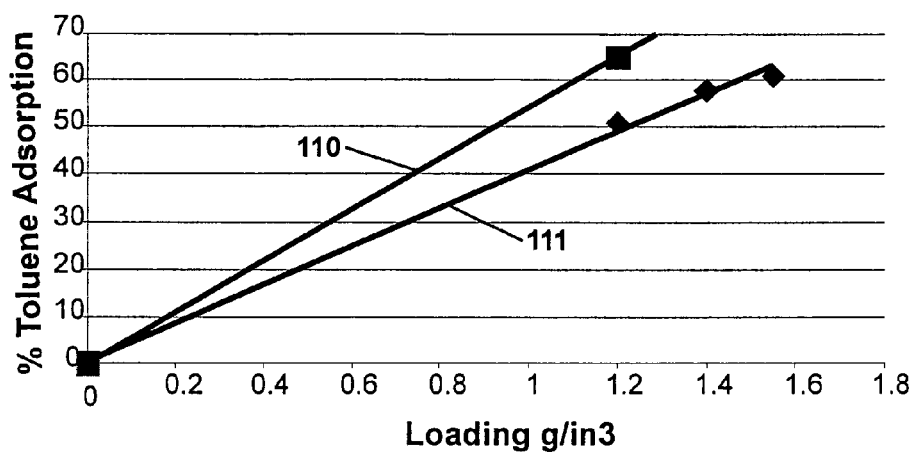
FIG. 8 is a graph showing the effect on adsorption efficiency for HC resulting from the mean particle size of the activated carbon.

As shown in FIG. 8, there is a greater adsorption for toulene than the unreduced particle size carbon. The trace illustrated by the upper curve designated by reference numeral 110 shows the adsorption efficiency for the activated carbon milled to 5 microns whereas the trace illustrated by the lower curve designated by reference numeral 111 shows the adsorption efficiency for the activated carbon having a mean particle diameter of approximately 14 microns. Preferably, an activated carbon mean particle size should not be greater than about 25 microns to achieve meaningful adsorption efficiencies, more preferably not greater than about 10 microns and most preferably not greater than about 5 microns. As a result, adsorption efficiencies in excess of 50% for the loading ranges discussed can be achieved for an atmosphere containing 2 to 6 ppm VOC and/or HC.

EXAMPLE 8

The activated carbon selected must be thermally stable under the temperature ranges discussed. Thermogravimetric analysis can be used to determine the ignition temperature of carbons. In this experiment, a small amount of the carbon is placed in the balance of the apparatus. This balance determines the weight of the carbon during the experiment. The temperature of the carbon is raised from room temperature to 1000° C. in air at a fixed rate (e.g. 20° C./minute). The weight of the carbon can then be plotted as a function of temperature. When the temperature of the carbon is sufficient to give ignition or burning, the carbon is oxidized to gaseous $CO_2$. As a result, the weight of the carbon is reduced. In practice when this ignition occurs a rapid loss of weight is observed.

Typically, when the temperature of a carbon is raised to 100° C., desorption of adsorbed water occurs. The weight of the carbon then remains constant as the temperature is raised until ignition occurs. At this point a dramatic loss in carbon weight is observed. The point at which this dramatic weight loss occurs is the ignition point.

For the subject application, it is important that the carbon does not burn at regeneration temperatures, i.e. the ignition temperature is below the maximum regeneration temperature. For the subject invention, the ignition temperature is higher than 300° C. An even higher ignition temperature is preferred.

Figure 9:
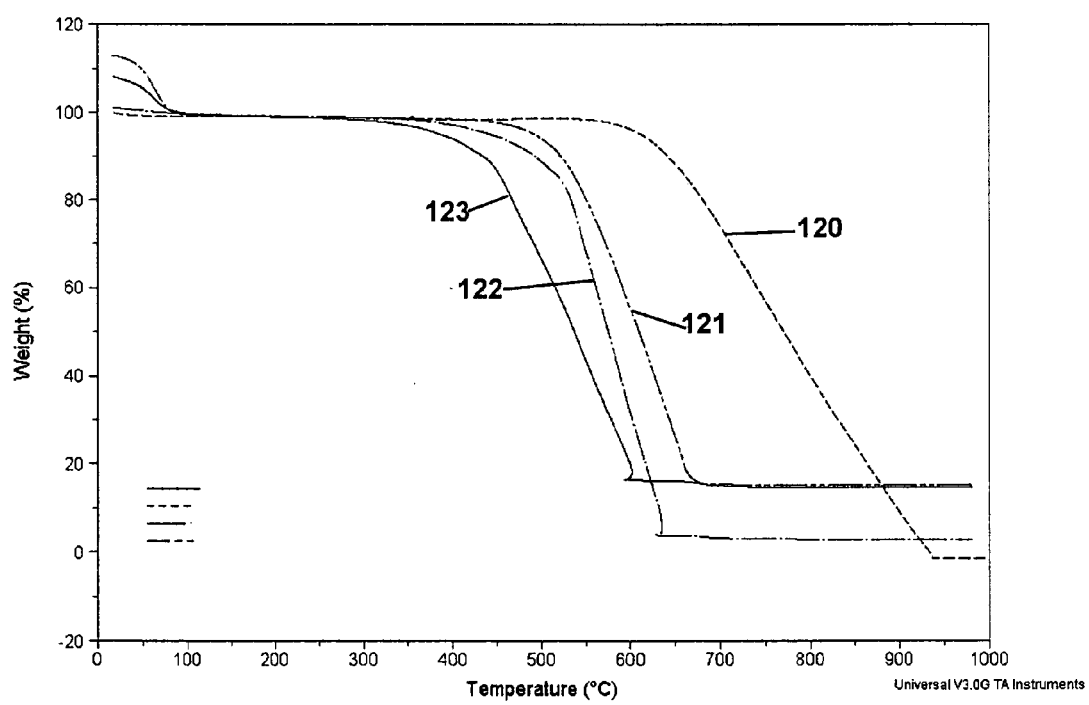
FIG. 9 is a graph showing test result traces of the auto ignition temperature for four different activated carbons; and, FIG. 10 is a schematic representation of an alternative heat wheel design.

Shown in FIG. 9 are TGA test results for four commercially available carbons. The tests results for each are shown as traces indicated by reference numerals 120 (Kreha Pw), 121 (Acticarbone), 122 (Carbon "A") and 123 (Carbchem SA30-1). Clearly there is a range of ignition temperatures from about 350° C. to about 650° C. Different carbons have different ignition temperatures depending on a number of factors such as carbon to hydrogen C/H ratio, degree of activation, morphology etc. This invention does not set limits for such factors to determine a satisfactory auto ignition temperature of the selected carbons. It is believed sufficient to note that the activated carbon selected must have an auto ignition temperature in excess of the upper limits of the potential operating temperature of the system and such activated carbons can be obtained from commercial suppliers if specified. It is noted that because of the potential for the carbon to auto ignite and deteriorate at higher temperatures such as shown in FIG. 9, the adsorbent wheel system of the present invention discussed above may have an optional routine for monitoring the exhaust gas temperature and thus for indexing the wheel in a temperature override situation. Additionally, the system may have, as an option, a baffle at inlet end 43 of heat inlet duct 42 which could be actuated (not shown) to open or close flow of atmosphere stream 25 into heat inlet duct 42 (thus forming heated atmosphere stream 26). If a potentially damaging high exhaust gas condition occurred, the actuator for heat inlet duct 42 would be closed.

D2) The Binder.

Although organic polymer binders (such as acrylic latex binders) find extensive use in the architectural paint industry, their use for other applications is limited by the maximum use temperature of the specific application. In general, acrylic latex type organic polymer binders are not suitable for use at temperatures above 150° C. since the polymer degrades and thereby loses its adhesive and binding capability. For applications that require binding at temperatures in excess of 150° C., the use of silicone polymers is one alternative. For example, silicone polymers find use as binding aids for coatings applied to smokestacks or automobile mufflers that can reach several hundred degrees Celsius in normal application. Although the organic portion (e.g. the methyl and phenyl groups) of the silicone polymer will degrade at high temperature, the Si—O network of the polymer molecule remains. This network of inorganic (Si—O—Si—O)$_x$ polymer helps to provide binding for coatings at high temperature.

Research has shown that incorporation of polymeric silicone binders into carbon-containing slurries substantially improves the adhesion of coatings derived therefrom after high temperature heat treatment of the coatings. Further, it has been found that heat treating carbon coatings containing silicone latex binder under nitrogen at 200° C. (i.e. "carbonizing" the coating) prior to high temperature exposure in air provides an additional improvement to the coating adhesion. Finally, addition of other inorganic silicone containing materials such as sodium silicate and silica sols has been shown to improve coating adhesion as well.

EXAMPLE 9

A carbon-containing slurry was prepared by first milling 250 g of Kreha PW carbon (lot#97020) in 375 g of DI water using a ball mill. To aid in the milling process, 30 g of Tamol 165A dispersant (25% solids solution; 3% solids basis relative to carbon solids) was added. Periodic dropwise additions of Rhodoline 999 defoaming agent were also required to eliminate the buildup of foam in the milled slurry. The carbon was milled for a total of 74 hours to a median particle size of 4 um (90%<6.6 um). 100 g of the resulting milled slurry was combined with 7.02 g of Attagel 50 suspension aid (13% solids solution; 5% solids basis relative to carbon solids), 7.30 g of P-376 acrylic latex binder (50% solids dispersion; 20% solids basis relative to carbon solids), 0.09 g of BC-720 wetting agent (99.5% solids solution; 0.5% solids basis relative to carbon solids), and 0.11 g of Nuosept 95 preservative (50% solids solution; 0.29% solids basis relative to carbon solids). The Tamol 165A dispersing aid and the P-376 latex binder were purchased from Rohm & Haas; the Rhodoline 999 defoaming agent and the BC-720 wetting agent were purchased from Rhodia; the Attagel 50 suspension aid was obtained from Engelhard Corporation; and the Nuosept 95 preservative was purchased from Huls Creanova.

The carbon slurry prepared above was coated onto two small pieces (minicores) of Volvo S80 high performance radiator (80 fins/dm; 1.5" deep). The loading of dry coating on each was about 0.5 g/in$^3$ of radiator minicore volume. After drying at 90° C. for approximately 30 minutes, the coated minicores were heated to 300° C. in air for approximately 2 hours. After this high temperature treatment, the minicores were then subjected to adhesion testing. This was accomplished by ultrasonicating the samples in water for 5 minutes at a power setting of 6 using a Crest variable power ultrasonic bath (model 4HT-710-3-ST). After ultrasonication, the samples were dried at 90° C., and the carbon coating weight loss for each due to ultrasonication was calculated. In this case, the average weight loss for both samples was very high (84%).

EXAMPLE 10

A carbon slurry was prepared according to the procedure outlined in Example 9 except that only 3.64 g of P-376 binder (50% solids dispersion; 10% solids basis relative to carbon solids) were added. In addition, 3.64 g of Silres M-50E silicone latex binder (50% solids dispersion; 10% solids basis relative to carbon solids) were added. The Silres M-50E binder was purchased from Wacker Chemie.

Coating and adhesion testing of radiator minicores using the slurry containing silicone polymer binder was accomplished as described in Example 9. In this case the average coating loss for the two samples was only 4%. Clearly, the M-50E silicone binder provided excellent adhesion for the carbon coating after high temperature exposure (4 vs. 84% coating loss).

EXAMPLE 11

A ceramic minicore sample coated with the silicone latex binder containing slurry prepared in Example 10 was evaluated for adsorption and, desorption of toluene in a laboratory reactor as discussed above. The test results indicated that after heat treatment to 300° C., the sample had excellent adsorption and desorption properties and removed 62% of the toluene from the reactor inlet stream.

EXAMPLE 12

A carbon slurry was prepared according to the general procedure outlined in Example 9 (4 um median particle size after milling) except that SA-30 brand carbon from Carbo-Chem was used instead of the Kreha PW carbon. Additionally, 5% Tamol 165A dispersant (solids basis relative to carbon solids) was added to the slurry instead of just 3%. Coating and adhesion testing of radiator minicores was accomplished as described in Example A. Again, the average coating loss for the two samples was very high (77%).

EXAMPLE 13

A carbon slurry was prepared according to the general procedure outlined in Example 10 (4 um median particle size after milling) except that SA-30 carbon from Carbo-Chem was used instead of the Kreha PW carbon. Additionally, 5% Tamol 165A dispersant (solids basis relative to carbon solids) was added to the slurry instead of just 3%. Coating and adhesion testing of radiator minicores was accomplished as described in Example 9. In this case the average coating loss for the two samples was 36%. Again, inclusion of the M-50E silicone latex binder into the SA-30 carbon slurry provided significantly improved adhesion for the carbon coating after high temperature exposure (36 vs. 77% coating loss).

EXAMPLE 14

A ceramic minicore sample coated with the silicone latex binder containing slurry prepared in Example 13 was evaluated for adsorption and desorption of toluene in a laboratory reactor according to the procedure outlined previously. The test results indicated that after heat treatment to 300° C., the sample had excellent adsorption and desorption properties and removed 64% of the toluene from the reactor inlet stream.

EXAMPLE 15

A carbon slurry was prepared according to the general procedure outlined in Example 10 (3 um median particle size after milling) except that SA-30 carbon from Carbo-Chem was used instead of the Kreha PW carbon. Additionally, 5% Tamol 165A dispersant (solids basis relative to carbon solids) was added to the slurry instead of just 3%, and 10% Nalco-Brand sodium silicate binder (solids basis relative to carbon solids) was also added. Coating and adhesion testing of radiator minicores was accomplished as described in Example 9, and average coating loss for the two samples was 23%. In this case, inclusion of the Nalco-Brand sodium silicate to the SA-30 carbon slurry provided further improvement to the coating adhesion after high temperature exposure beyond that seen with only the silicone binder (23 vs. 36% coating loss).

EXAMPLE 16

A carbon slurry was prepared according to the general procedure outlined in Example 10 (3 um median particle size after milling) except that SA-30 carbon from Carbo-Chem was used instead of the Kreha PW carbon. Additionally, 5% Tamol 165A dispersant (solids basis relative to carbon solids) was added to the slurry instead of just 3%, and 10% Nalco 2327 silica sol binder (solids basis relative to carbon solids) was also added. Coating and adhesion testing of radiator minicores was accomplished as described in Example 9, and average coating loss for the two samples was 27%. In this case, addition of the Nalco silica sol to the SA-30 carbon slurry provided further improvement to the coating adhesion after high temperature exposure beyond that seen with only the silicone binder (27 vs. 36% coating loss).

EXAMPLE 17

A carbon slurry was prepared according to the general procedure outlined in Example 9 (3 um median particle size after milling) except that SA-30 brand carbon from Carbo-Chem was used instead of the Kreha PW carbon. Additionally, 5% Tamol 165A dispersant (solids basis relative to carbon solids) was added to the slurry instead of just 3%, and 15% M-50E silicone binder (solids basis relative to carbon solids) was added instead of just 10%. Coating of radiator minicores was accomplished as described in Example 9. However, prior to heat treating the samples in air at 300° C. for two hours, the samples were first heat-treated (i.e., "carbonized") at 200° C. in nitrogen for two hours. After both heat treatments, the samples were subjected to ultrasonic adhesion testing as described in Example 9. Average coating loss was 16%. In this case, carbonizing the coating at 200° C. prior to high temperature exposure in air further improved the adhesion of the silicone-containing coating (16 vs. 34% coating loss).

In general summary, the examples discussed above show that binders formed of silicone, in any form, such as polymers, sols or silicates, or even combinations thereof, will effectively function, at the desorption temperature ranges discussed above to adhere the activated carbon to the substrate. In this regard the binder must meet at least two requirements. It has to adhere the activated carbon to the substrate so that the activated carbon particles are not stripped off the substrate from the heated atmosphere stream flowing through the channels. The binder also can not degrade at high temperatures so as to materially interfere with the porosity of the activated carbon and retard or hinder its ability to adsorb HC's VOC's.

As noted, the silicone containing activated carbon coating has been applied to the substrate by a heat treatment in air at temperature of about 300° C. which has produced a stable coating up to at least about 300° C. However, the coating can be heat treated at lesser temperatures and still exhibit stability at higher temperatures of at least about 300° C.

D3) Regenerative Wheel Application for Activated Carbon.

It has been observed that coated wheels, when placed in service, will experience a loss in efficiency during a relatively short "break in" period and thereafter will gradually decrease in efficiency reaching a relatively constant adsorption efficiency plateau. Reference can be made to assignee's co-pending application Ser. No. 09/579,563, filed May 26, 2000, for a detailed discussion of "road grime" causing wear of an $MnO_2$ ozone depleting catalyst applied to a vehicular radiator core to remove ozone from the atmosphere. (Note that ozone is deemed unhealthy at ambient trace concentrations of 120 parts per billion in contrast to the 2–6 ppm range of VOC's present in the atmosphere.) Generally, wear occurs due to deposition of airborne particulates less than 10 um in size. These airborne particulates typically contain elements such as C, N, O, Na, Mg, Al, Si, S, K, Cl and Ca. Activated carbon is well known for its use as a particulate filter. It would logically appear that airborne particulates will eventually affect the porosity of the activated carbon and thereby reduce its efficiency. This has not been observed because the efficiency of the activated carbon is retained. It has been suggested that the thermal disturbance inputted to the light weight metal foil of the preferred embodiment in the shielded heated regeneration zone coupled with the air flow could conceivably allow removal of particulates including salts not firmly embedded in the activated carbon. The removal is believed enhanced for counter current flow application. In any event, the activated carbon, of the type specified above, purifies the atmosphere of what can only be classified as unhealthy substances even though the matter is not deemed a VOC, HC, ozone or some other gaseous element subject to regulation by governmental agencies.

It should also be noted that while the main thrust of this invention is for a system to remove VOC's, particularly HC's, from the atmosphere (which are subsequently cleansed before disposal), example 3 above shows that activated carbon is surprisingly effective to remove ozone, $O^3$, and, in fact, achieves rather high efficiencies in this regard. The system is thus effective, not only as a VOC purifying system but also an ozone depletion system. In this regard, the calorimetric sensor which functions as an OBD device to detect failure of heat wheel to remove VOC's may also function as OBD device to detect failure of the system to convert ozone to oxygen. As noted above, a correlation between VOC heat wheel life and ozone removal life can be empirically modeled and utilized. Alternatively, assuming that the VOC life of the activated carbon is less than that of the activated carbon to remove ozone (which is believed likely because of the greater quantity of VOC treated, but which has not yet been established by tests), only the VOC's can be monitored. A VOC failure means wheel replacement and therefore regeneration of the ozone removal system.

E) Alternatives

The invention has been described with reference to a preferred embodiment capable of practically achieving cleansing of the atmosphere of VOC's including HC's as well as other matter with an activated carbon as an adsorbant. It is contemplated that a catalyst can also be provided in channels 70 with the activated carbon but not as a mixture or a composition. For example, channels 70 could be coated with activated carbon over a half-channel length portion adjacent to entrance face surface 31 and an ozone depleting substance, $MnO^2$, applied over a half-channel length portion adjacent to exit face surface 32. In this example, activated carbon and $MnO^2$ would not contact one another so that heat wheel 30 could be viewed as being split into two heat wheels. While activated carbon does remove ozone, as noted, coupling the activated carbon with an ozone depleting substance chosen for that purpose will enhance the overall efficiency of heat wheel 30 to dispose of ozone. In this instance, the ozone depleting substance, $MnO^2$, is capable of withstanding the regeneration temperatures of the application (150 to 300° C.) without deterioration. In fact, the $MnO_2$ destruction catalyst will have its life significantly extended due to thermal cleansing when compared to current automotive applications where it is typically applied to the radiator core. Additionally, calorimetric sensor 80 can simultaneously function as an OBD sensor for the $MnO^2$ catalyst because it is believed that the life of the activated carbon to adsorb HC's will be shorter than the life of the regenerated ozone depleting material. Thus detection of failure necessarily results in replacement of the heat wheel with a fresh ozone depleting substance.

This invention has determined that a regenerative wheel is the preferred mechanism for effecting adsorption in an automotive environment. In the preferred embodiment and as one aspect of the invention, the wheel rotates because this is the simplest way to achieve regeneration while avoiding using of moving blades, baffles, fans, valves etc. which, as noted, is not desired. However, the invention can obviously function with a stationary wheel and moving atmosphere streams. Thus insofar as the invention is directed to an activated carbon adsorbent of the type described above, the invention is not necessarily limited to a rotating wheel. Similarly, second position dependent portion 66 of heat wheel 30 has been described as comprising one "pie-shaped" or arcuate segment 60, but several could be employed.

Figure 10:
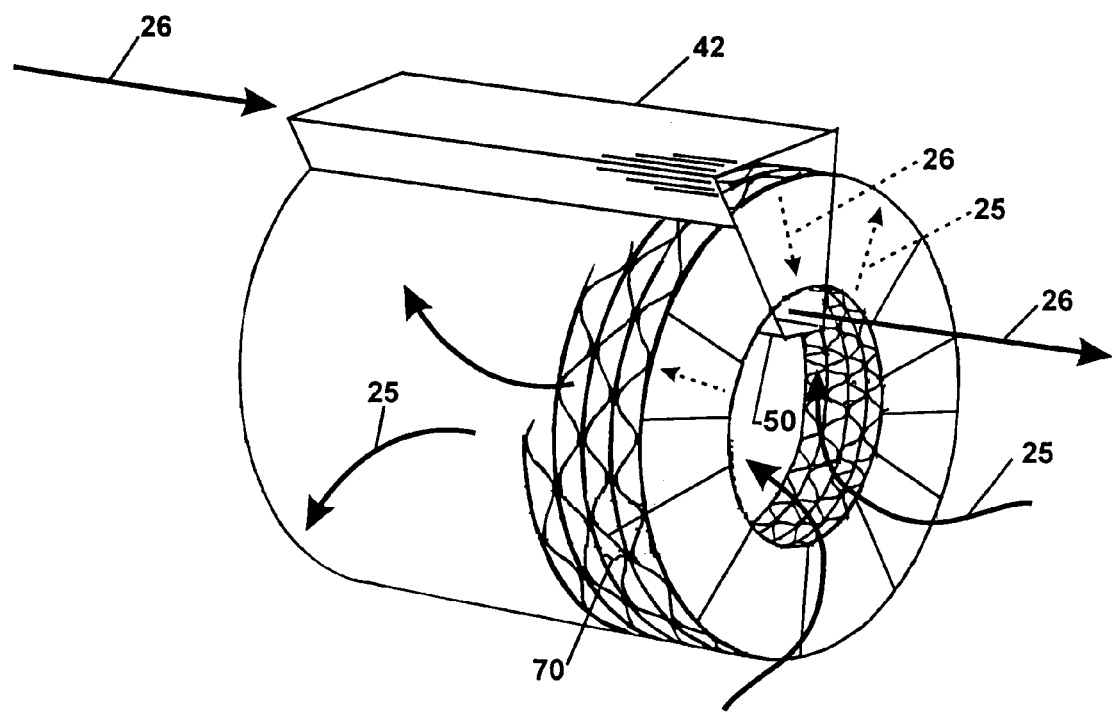

Heat wheel 30 has been described and shown in the preferred embodiment, to be a "monolith" in a pancake type configuration having channels longitudinally extending the width or depth of the wheel. However, the invention is not necessarily limited to this wheel design. Other wheel configurations can be used. For example, a wheel in which channels 70 extended radially could be employed. Reference can he had to FIG. 10 which schematically illustrates such a wheel, and the same reference numerals used for describing heat wheel 30 depicted in FIGS. 2 through 4 are used with reference to the heat wheel of FIG. 10. The FIG. 10 heat wheel is not unique, but as can be seen from FIG. 10, this heat wheel design offers alternatives to the ducting disclosed in the preferred embodiment. By radially positioning heat inlet and outlet ducts 42, 50 respectively, isolation of second position dependent portion 66 of the heat wheel could be enhanced providing duct sizing did not create a significant pressure drop.

The invention has been described with reference to a preferred and alternative embodiments thereof. Modifications and alterations will become apparent to those skilled in the art upon reading and understanding the Detailed Description of the invention set forth herein. It is intended to include all such modifications and alterations insofar as they come with the scope of the present invention.

Having thus defined the invention it is claimed:

1. A method for cleansing the atmosphere by a vehicle powered by an internal combustion engine comprising the steps of:
   a) drawing a first stream of atmosphere into the engine compartment of a vehicle by means of a fan and/or the motion of the vehicle, said first atmosphere stream being at ambient engine cabin temperature;
   b) drawing a second stream of atmosphere either separately from said first stream or split from said first stream into said second stream by means of a fan and/or the motion of the vehicle;
   c) heating said second atmosphere stream by sensible heat from exhaust gases produced by said engine to temperatures in the range of approximately 150° to 300° C.;
   d) providing a heat wheel having channels extending therethrough from one side of said heat wheel to the opposite side of said heat wheel; said channels having as a coating thereon activated carbon of a micropore porosity, said carbon having a density of at least 0.5 g/in$^3$ and a mean particle size not greater than 25 microns;
   e) passing said first stream of atmosphere through channels occupying, at any given time, a first position dependent portion of said heat wheel to adsorb volatile organic compounds contained in said atmosphere;
   f) passing said second stream of heated atmosphere through channels occupying, at any given time, a second position dependent portion of said heat wheel to desorb volatile organic compounds contained in said channels;
   g) directing said second stream of heated atmosphere with volatile organic compounds desorbed from said wheel to the gaseous emission treating system of said vehicle; and,
   h) rotating said wheel so that before the channels in said first position dependent portion of said heat wheel become saturated with volatile organic compounds they are rotated into a position whereat die channels become channels fanning the second position dependent portion of said heat wheel while the desorbed channels formerly forming the second position dependent portion of said heat wheel are rotated into a position whereat the channels become part of the channels forming said first position dependent portion of said heat wheel.

2. The method of claim 1 wherein said heat wheel is rotated as a function of the time it takes to desorb the volatile organic compounds in said second position dependent portion of said heat wheel.

3. The method of claim 2 wherein said heating of said second atmosphere stream occurs by passing said second stream over an exhaust manifold of said engine.

4. The method of claim 3 further including the step of sensing the hydrocarbons in said second atmosphere stream after said second atmosphere stream has passed through said second position dependent portion of said heat wheel and rotating said heat wheel through a set, included angle when hydrocarbons are no longer sensed as being present for a set time period.

5. The method of claim 4 further including the step of providing an alarm in an operator cabin of said vehicle and actuating said alarm if hydrocarbons are not initially sensed upon rotation of said heat wheel.

6. The method of claim 5 wherein said sensing step is accomplished by a calorimetric sensor having a heated catalyzed surface and a heated non-catalyzed surface over which a slip stream of said second atmosphere stream is passed after leaving said heat wheel.

7. The method of claim 6 wherein the mean activated carbon particle size is less than 25 microns and said activated carbon including the step of reducing ozone in addition to adsorbing said volatile organic compounds so that the step of regenerating said activated carbon upon heating not only regenerating the ability of said activated carbon to adsorb volatile organic compounds but also regenerating the ability of said activated carbon to catalyze ozone reducing reactions to $O^2$.

8. The method of claim 7 wherein the step of directing said second atmosphere stream to said vehicle's emission system after passing through said heat wheel occurs by initially directing said second atmosphere stream to an intake manifold of said engine.

9. The method of claim 8 wherein said wheel is divided into a plurality of arcuate segments of an included angle extending between radial lines defining the edge of each segment, said wheel having a radial space between radial edge lines of each segment so that as each segment is rotated into said second position dependent portion, the heat from the segment in said second position dependent portion tending to be isolated from the segments in said first position dependent portion.

10. The method of claim 9 wherein said rotation occurs by sensing the temperature of said exhaust gases and indexing said wheel before heat from said second position dependent portion of said wheel materially affects the temperature of said segments in said first dependent portion of said heat wheel provided that said hydrocarbons sensed in said heat outlet duct have dropped below a set value.

11. The method of claim 1 further including the step of adhering said activated carbon as a coating on said channels by providing a slurry of said activated carbon to which is added a silicone binder in any form and heating said slurry applied to said channels at elevated temperatures in the presence of air to stabilize said coating at temperatures at least up to 300° C.

12. The method of claim 11 wherein said silicone binder is a silicone latex binder and said slurry is initially heated in only the presence of an inert gas at an initial temperature.

13. The method of claim 12 wherein said inert gas is nitrogen and said slurry is initially heated to temperatures less than said elevated temperature and said elevated temperature is approximately 300° C.

* * * * *